(12) United States Patent
Baggerman

(10) Patent No.: US 10,606,649 B2
(45) Date of Patent: Mar. 31, 2020

(54) WORKLOAD IDENTIFICATION AND DISPLAY OF WORKLOAD-SPECIFIC METRICS

(71) Applicant: Nutanix, Inc., San Jose, CA (US)

(72) Inventor: Cornelis Hendrikus Baggerman, Den Dolder (NL)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/492,860

(22) Filed: Apr. 20, 2017

(65) Prior Publication Data

US 2020/0026566 A1    Jan. 23, 2020

(51) Int. Cl.
| | |
|---|---|
| *G06F 9/50* | (2006.01) |
| *G06F 9/451* | (2018.01) |
| *G06F 40/186* | (2020.01) |
| *G06F 3/0481* | (2013.01) |

(52) U.S. Cl.
CPC ............ *G06F 9/5027* (2013.01); *G06F 9/451* (2018.02); *G06F 40/186* (2020.01); *G06F 3/0481* (2013.01)

(58) Field of Classification Search
CPC .................................................... G06F 9/5027
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 2010/0115510 A1 | 5/2010 | Ford et al. | |
| 2014/0176583 A1 | 6/2014 | Abiezzi et al. | |
| 2014/0181806 A1 | 6/2014 | Abiezzi et al. | |
| 2015/0365349 A1* | 12/2015 | Verma ................. | H04L 67/1008 709/226 |
| 2015/0371354 A1 | 12/2015 | Petersen et al. | |
| 2015/0378764 A1* | 12/2015 | Sivasubramanian ....................... | G06F 9/45558 718/1 |

OTHER PUBLICATIONS

Activity Monitor for mac: How to speed up macBook using Activity Monitor, Aug. 2016 (Year: 2016).*

(Continued)

*Primary Examiner* — Charlie Sun
(74) *Attorney, Agent, or Firm* — Vista IP Law Group, LLP

(57) ABSTRACT

An architecture for implementing a mechanism for automatically displaying metrics specific to a type of workload being processed by a computer system is provided. The mechanism predicts a classification of the workload based on attributes that characterize the workload using a set of workload profiles and/or a set of classification rules that correlate different combinations of attributes of workloads with different classifications of workloads. Based on the predicted classification of the workload, one or more templates including one or more metrics specific to the classification of workload are identified. The template(s) including the metric(s) specific to the classification of the workload may be identified using set of rules that associate the metric(s) with the predicted classification of the workload. A user interface including the metric(s) is generated based on the template(s). The user interface may then be displayed to a user of the computer system.

51 Claims, 14 Drawing Sheets

(56) References Cited

OTHER PUBLICATIONS

Notice of Allowance dated Aug. 24, 2018 for related U.S. Appl. No. 15/463,830, 9 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

WORKLOAD IDENTIFICATION AND DISPLAY OF WORKLOAD-SPECIFIC METRICS

FIELD

This disclosure concerns a method, a computer program product, and a computer system for identifying a type of workload being performed on a computer system and displaying one or more metrics specific to the type of workload identified.

BACKGROUND

Computer systems, such as clients (e.g., workstations, personal computers, or remote computing terminals) and servers (e.g., mainframes or database servers), may process a wide variety of workloads. Generally, a workload may be described as an amount of processing performed by a computer system for a specific computing task (e.g., creating spreadsheets, sending email, etc.). Different types of workloads correspond to computing tasks being performed for different types of applications. Therefore, different types of workloads are likely to utilize computing resources differently. For example, the amounts of CPU, GPU, memory, and storage used to process a workload for a game application may be very different from the amounts of the same resources used to process a workload for a relational database management system, which may also be very different from the amounts of the same resources used to process a workload for a Webmail service, etc. In this example, the rates at which the resources are used and patterns describing their usage may differ as well for each type of workload.

The utilization of computing resources by a computer system to process a workload may be described with various metrics. Examples of such metrics include percentage of CPU utilized, reads in per second, writes out per second, disk latency, etc. Depending on the type of workload being processed by a computer system, certain metrics describing resource utilization may be more relevant than others. For example, suppose a type of workload being processed by a computer system is characterized by heavy usage of GPU resources (e.g., for a video editing application or for a gaming application). In this example, a metric describing a percentage of available GPU resources that are being utilized by the computer system will be especially relevant to a user of the computer system since this metric will provide the user with information to determine whether the amount of unused GPU resources available on the computer system are sufficient to meet the user's needs (e.g., to continue to process the workload, to process additional GPU-intensive workloads, etc.).

Without these metrics, if the computing resources of a computer system are utilized to such an extent that they are nearly exhausted (e.g., when utilization of GPU resources approaches 100% of available GPU resources), a user of the computer system may experience degradation in performance without warning. For example, the user may notice that their workload is being processed by the computer system at a slower than usual rate or the application for which the workload is being processed may even crash. Thus, to prevent and diagnose performance issues, users of computer systems will often find it helpful to monitor certain metrics on their computer systems based on the types of workloads being processed.

Many operating systems running on computer systems include tools that may help users monitor such metrics and manage their workloads. For example, macOS Activity Monitor offers users a table that displays processes currently running on the macOS operating system, the amounts of available computing resources being utilized by each process, and information indicating which of the processes are using the majority of available computing resources. From this table, a user may request to quit an application that is using too many computing resources. Windows Task Manager also offers users a similar type of table for processes running on the Windows operating system.

However, since these types of tools present users with a list of several processes running on an operating system, some users may have difficulty keeping track of the usage of resources by any particular process. Additionally, keeping track of these metrics is complicated in situations in which the workloads being processed by computer systems frequently change. For example, a system administrator may have a difficult time keeping track of resource usage by multiple emulated computer systems (e.g., virtual machines) deployed on multiple nodes or multiple clusters of nodes in a networked virtualization system, in which users of the emulated computer systems frequently come and go.

Furthermore, some metrics may not be available using the tools provided by operating systems. For example, metrics provided by such tools may not indicate a distribution of input/output performed over multiple disks or disk latency, which are especially relevant to workloads processed by relational database management systems. As an additional example these tools may not provide metrics indicating GPU usage, which is especially relevant to workloads processed by gaming applications. In order to obtain these types of metrics, users may be required to install additional tools on their computer systems that are specific to each of the types of workloads being processed. However, requiring users to install and become familiarized with such tools may only add to the complexity of keeping track of workload-related metrics.

Therefore, there is a need for an improved approach for presenting metrics that are relevant to a workload being processed by a computer system.

SUMMARY

Embodiments of the present invention provide a method, a computer program product, and a computer system for identifying a type of workload being performed on a computer system and displaying one or more metrics specific to the type of workload identified.

According to some embodiments, a dashboard generator is implemented to receive information describing a workload being performed on a computer system. The workload may be described in terms of attributes that may characterize the workload, such as utilization of computing resources, input/output patterns, an identifier associated with the computer system (e.g., based on a naming convention), etc. The information describing the workload may be processed by the dashboard generator to predict a classification of the workload using a set of workload profiles and/or a set of classification rules that correlate different combinations of attributes of workloads with different classifications of workloads. The dashboard generator generates a user interface including one or more metrics specific to the workload (i.e., metrics that are likely to be relevant to a user of the computer system based on the specific type of workload being processed by the computer system). Metrics that are specific to the workload may be identified based on a set of templates and/or a set of rules that associate the metrics with the classification of the workload predicted by the dashboard generator. The dashboard generator then displays the user interface to the user of the computer system.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

The present disclosure provides an approach for identifying a type of workload being performed on a computer system and displaying one or more metrics specific to the type of workload identified.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Figure 1:
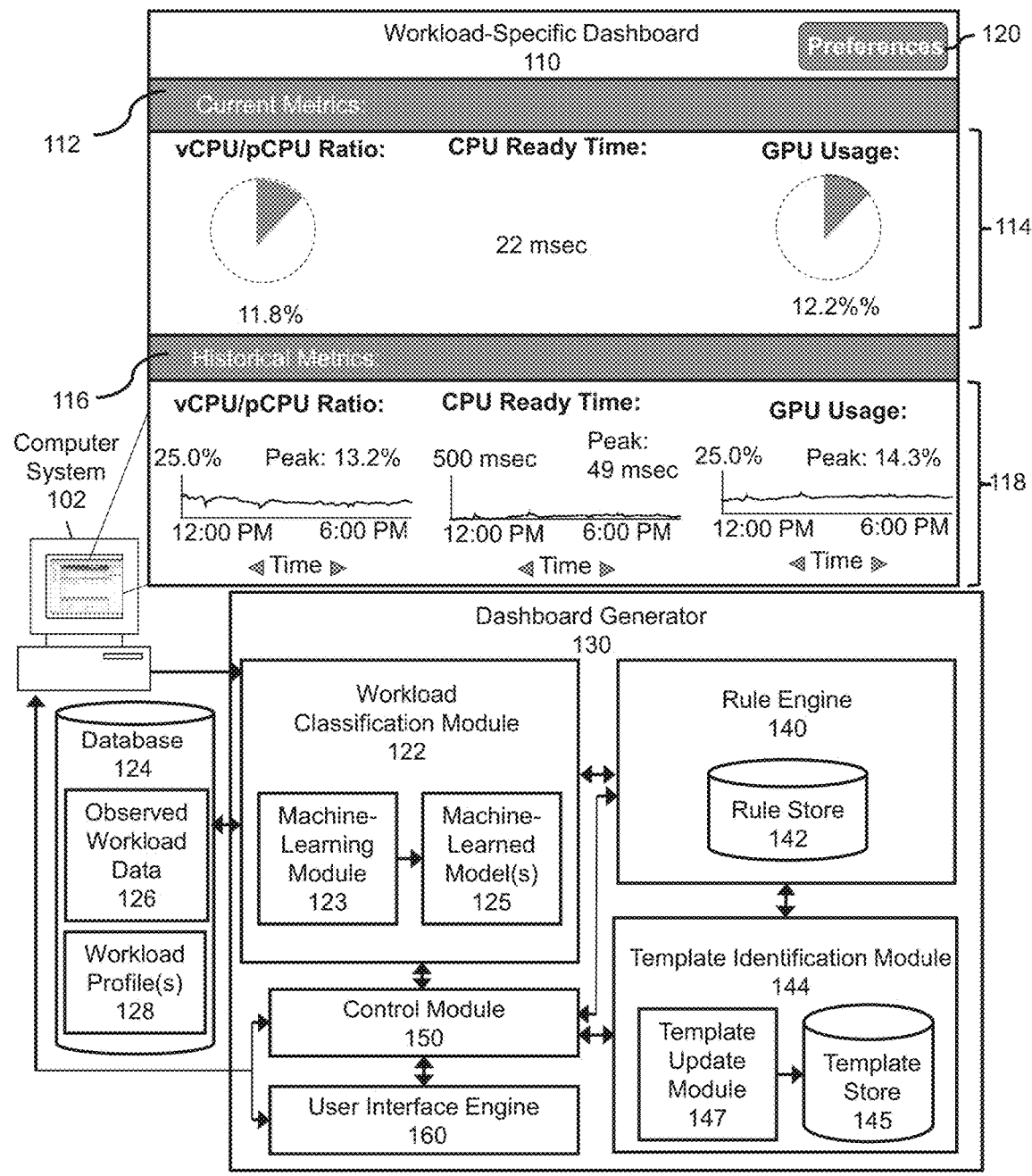
FIG. 1 illustrates an apparatus including a dashboard generator in which some embodiments of the invention are implemented.

FIG. 1 illustrates an apparatus including a dashboard generator in which some embodiments of the invention are implemented. In various embodiments, some aspects of the embodiments may be implemented separately or as a whole.

A dashboard generator 130 includes various components that may be used to classify one or more workloads performed on a computer system 102 and to display one or more metrics specific to the classified workload(s). In some embodiments, components of the dashboard generator 130 include a workload classification module 122, a rule engine 140, and a template identification module 144. The workload classification module 122 receives information describing a workload being processed by the computer system 102 and may predict a type or a "classification" of the workload. Examples of classifications of workloads include database workloads, email workloads, word processing workloads, gaming workloads, etc.). A workload may be classified based on a type of application for which the workload is being processed. For example, workloads may include end-user computing (EUC) workloads being processed for Citrix XenDesktop, email workloads being processed for Microsoft Exchange, and database workloads being processed for Microsoft SQL. The classification of the workload may be predicted based on a set of workload classification rules identified by the rule engine 140 and/or based on a set of workload profiles 128 that each describe a classification of workload. The template identification module 144 may identify a template describing one or more metrics that are relevant to the classification of workload predicted by the workload classification module 122. The dashboard generator 130 may then generate a user interface (e.g., a workload-specific dashboard 110) that includes the metrics described by the template for the workload being processed by the computer system 102. Finally, the dashboard generator 130 may present the user interface to a user of the computer system 102.

The information describing the workload received at the workload classification module 122 may include various attributes that characterize the workload. In some embodiments, an attribute of a workload may describe the utilization of one or more computing resources required to process the workload. For example, a particular workload may require utilization of a specific amount of CPU and memory available on the computer system 102 for a duration of eight hours in order to perform a computing task. An attribute of the workload may also include an input/output pattern. For example, a workload may be characterized by a particular ratio of reads to writes performed randomly (rather than sequentially) on a particular number of blocks of data on a disk drive. Additionally, an attribute that characterizes the workload may include an identifier that is associated with the computer system 102. For example, if the computer system 102 is an emulated computer system (e.g., a virtual machine), a name may be assigned to the emulated computer system based on a naming convention that describes a classification of workload to be processed using the emulated computer system. In this example, a name containing "EXCH," "Exchange," or "Mail" may be assigned by a system administrator to the emulated computer system that is to be used for processing email workloads using Microsoft Exchange.

The workload classification module 122 may receive the information describing the workload of the computer system 102 in various ways. In some embodiments, the workload classification module 122 receives the information describing the workload of the computer system 102 automatically. For example, the information may be received by the workload classification module 122 absent a request sent by the dashboard generator 130 to the computer system 102. Alternatively, the dashboard generator 130 may submit a request for the information describing the workload of the computer system 102 (e.g., periodically); this information is then received at the workload classification module 122 in response to the request. In some embodiments, upon receiving the information describing the workload of the computer system 102, the workload classification module 122 may store the information describing the workload of the computer system 102 (e.g., as observed workload data 126 in a database 124) for subsequent retrieval.

As mentioned above, the workload classification module 122 may predict a classification of the workload being processed by the computer system 102 based on a set of workload profiles 128. A workload profile 128 may describe one or more or attributes that generally characterize a given classification of workload. For example, a workload profile 128 for a database workload may be characterized by a high read/write ratio and usage of high amounts of CPU and RAM. Attributes describing workload profiles 128 may be described in terms of ranges (e.g., between 200 to 300 MB of memory), thresholds (e.g., less than 10% CPU), ratios or percentages (e.g., 75% of available GPU), patterns (e.g., random or sequential access patterns), relative quantities (e.g., high storage usage), etc.

Additionally, as mentioned above, the workload classification module 122 may also or alternatively predict the classification of the workload based on a set of workload classification rules stored in a rule store 142. Each workload classification rule may associate various attributes that may characterize a workload with a classification of workload, such that different combinations of attributes correspond to different classifications of workloads. For example, a workload classification rule may associate a particular input/output pattern characterizing a workload (e.g., low read/write ratio performed in a random pattern on 4 KB blocks) with a particular classification of workload (e.g., an EUC workload) while a different workload classification rule may associate a different input/output pattern characterizing a workload (e.g., high read/write ratio performed in a random pattern on 64 KB blocks) with a different classification of workload (e.g., a database workload). In some embodiments, the workload classification rules may be received by the dashboard generator 130 from a user, such as a system administrator, and stored in the rule store 142 by the rule engine 140.

In some embodiments, the rule engine 140 may access the rule store 142 to identify the set of workload classification rules that are used by the workload classification module 122 to predict the classification of the workload being processed by the computer system 102. For example, the rule engine 140 may receive information from the workload classification module 122 describing one or more attributes (e.g., input/output pattern, resource usage, etc.) that characterize the workload; based on the attributes, the rule engine 140 may identify a set of workload classification rules in the rule store 142 that associate the attributes of the workload with one or more classifications of workloads. In this example, the workload classification module 122 may then use the set of rules identified by the rule store 142 to predict a classification of the workload. Workload classification rules are further described below in conjunction with FIG. 3A.

In some embodiments, the workload classification module 122 may include a machine-learning module 123 that trains one or more machine-learned models 125 to predict a classification of the workload being processed by the computer system 102. The machine-learning module 123 may train a machine-learned model 125 to predict a classification of the workload using a supervised learning algorithm based on a set of training data that may be retrieved from the database 124. For example, suppose the training data includes observed workload data 126, in which each instance of the observed workload data 126 is associated with attributes characterizing the instance and has been verified to be of a particular classification (e.g., by the user of the computer system 102). The machine-learning module 123 may represent each instance as a feature vector in vector space by quantifying each attribute characterizing the instance (e.g., amount of CPU or RAM usage). The feature vectors representing the observed workload data 126 may be allocated to a set of clusters, such that each cluster is associated with a classification of workload and includes feature vectors representing instances of the observed workload data 126 that are of the same classification. Furthermore, the machine-learning module 123 may determine a centroid associated with each cluster that represents the mean of the feature vectors included in the cluster. The machine-learning module 123 may then use the training data to train a model 125 based on correlations between different combinations of attributes characterizing the instances and the classifications of workloads to which the instances belong, as represented by the clusters.

Once the model 125 has been trained, the workload classification module 122 may use it to predict a classification of a new instance of a workload based on attributes characterizing the new instance of the workload. Continuing with the above example, upon receiving information describing a new instance of a workload being processed by the computer system 102, the workload classification module 122 may represent the new instance as a feature vector. The workload classification module 122 may then identify a cluster having a centroid closest to the feature vector and predict the classification of the new instance to be the classification of workload associated with the cluster.

In various embodiments, the machine-learning module 123 may also or alternatively train a machine-learned model 125 using an unsupervised learning algorithm. Furthermore, the model 125 may be trained using algorithms that are not clustering algorithms (e.g., decision trees, linear regression, support vector machines, etc.). In embodiments in which a machine-learned model 125 has been trained to predict a classification of the workload being processed by the computer system 102, the machine-learned model 125 may be retrained periodically (e.g., once every week) or upon the occurrence of an event (e.g., upon receipt of a new set of training data).

Based on the classification of the workload predicted by the workload classification module 122, the template identification module 144 may identify a template that describes one or more metrics that are likely to be relevant to the predicted classification of workload. The template may be identified by the template identification module 144 from multiple templates stored in a template store 145. The templates stored in the template store 145 may associate different classifications of workloads with different combinations of metrics, such that each classification of workload is associated with a set of metrics that are likely to be relevant to the classification of workload. For example, a template for a database workload may be associated with metrics including disk latency, ram usage, and spread of disk input/output across disks and disk controllers.

In various embodiments, the template identification module 144 may include a template update module 147. The template update module 147 may update information stored in the template store 145 based on information received from a user. For example, in response to receiving information describing a template from a user of the computer system 102 (e.g., described in a user editable document received from the user), the template update module 147 adds the template to the template store 145. As an additional example, if a user of the computer system 102 submits a request to the dashboard generator 130 to associate a particular set of metrics with database workloads, the template update module 147 may update a template associated with database workloads to describe the set of metrics specified by the user. In some embodiments, the template update module 147 may store additional types of information in association with templates in the template store 145. For example, a template may be stored in association with user identifying information (e.g., user login credentials) that are associated with a particular user of the computer system 102 and a date/time (e.g., a date that the template was stored in the template store 145 or updated).

In some embodiments, in addition to the classification of the workload predicted by the workload classification module 122, the template identification module 144 may also identify a template that describes one or more metrics that are likely to be relevant to the predicted classification of workload for a particular user of the computer system 102. For example, the information describing the workload of the computer system 102 received at the workload classification module 122 may include information identifying a user of the computer system 102, such as a user name or a login ID. In this example, this information may be communicated to the template identification module 144 along with the classification of the workload predicted by the workload classification module 122. Based on this information, the template identification module 144 may identify a template that not only describes one or more metrics that are likely to be relevant to the predicted classification of workload, but which is also stored in the template store 145 in association with information identifying the user.

A template may specify one or more ways in which each metric described by the template may be expressed or displayed in the workload-specific dashboard 110. For example, a template may specify that a metric describing GPU usage may be displayed numerically (e.g., as a ratio or as a percentage) and/or using a particular graphical format (e.g., a pie chart). As an additional example, a template may specify that a metric describing CPU ready time (i.e., an amount of time that a virtual machine is ready to use CPU resources, but is unable to do so due to lack of available CPU resources) may be displayed numerically in milliseconds. In some embodiments, a template may specify how both current metrics 112 and historical metrics 116 described by the template may be expressed or displayed. For example, a template may specify that current vCPU/pCPU ratio and current GPU usage should be expressed numerically as percentages and graphically as pie charts and that current CPU ready time should be expressed numerically in milliseconds 114. In this example, the template may also specify that all three historical metrics 116 should be expressed as line graphs 118 that plot the metrics as a function of time using the same units as the current metrics 112. Templates stored in the template store 145 are further described below in conjunction with FIGS. 4A-4C.

In some embodiments, the template identification module 144 may identify multiple templates that each describe a metric that is relevant to the classification of workload predicted by the workload classification module 122. In such embodiments, each template may be identified by the template identification module 144 based on one or more workload-specific metrics rules in the rule store 142. A workload-specific metrics rule may associate a classification of workload with a combination of metrics that are most likely to be relevant to the classification of workload. For example, a workload-specific metrics rule may associate email workloads with metrics describing disk space usage and input/output patterns, since these metrics are most likely to be relevant to email workloads. Similar to the templates described above, information describing the workload-specific metrics rules stored in the rule store 142 may be received from a user (e.g., a system administrator for a networked virtualization system).

The workload-specific metrics rules that are used by the template identification module 144 to identify one or more templates from the template store 145 may be identified by the rule engine 140. For example, based on information received from the workload classification module 122 describing the predicted classification of a workload, the rule engine 140 may identify a set of workload-specific metrics rules in the rule store 142 that each describe a metric that is relevant to the predicted classification of the workload. The template identification module 144 may then access the template store 145 and identify a template for each metric described by the set of workload-specific metrics rules. Workload-specific metrics rules are further described below in conjunction with FIG. 3B.

The dashboard generator 130 may also include a control module 150 to interface with the workload classification module 122, the rule engine 140, and the template identification module 144. For example, the control module 150 may be used to coordinate the receipt or retrieval of inputs from the computer system 102, the output of the workload-specific dashboard 110, and the implementation of rules or commands and processing of data received via the user interface engine 160 or from the database 124.

Additionally, the dashboard generator 130 may include a user interface engine 160. The user interface engine 160 generates the workload-specific dashboard 110 including the metrics that are relevant to the classified workload based on the template(s) identified by the template identification module 144. As specified by the template(s), the workload-specific dashboard 110 may include current metrics 112 and/or historical metrics 116 which are expressed or displayed numerically, graphically, etc. In some embodiments, the workload-specific dashboard 110 may also include one or more interactive elements with which a user of the computer system 102 may interact. For example, the workload-specific dashboard 110 may include a preferences button 120; by interacting with this button 120, a user may set one or more preferences associated with the workload-specific dashboard 110 (e.g., to change a numerical representation of a metric to a graphical representation of the metric). Once the workload-specific dashboard 110 has been generated, the user interface engine 160 may display it to a user of the computer system 102.

The user interface engine 160 also allows a system administrator or other user to interact with the dashboard generator 130 either remotely or via a local instance of the dashboard generator 130, such as through a traditional application interface or via a management console for remote management of the dashboard generator 130. For example, a system administrator may interact with the dashboard generator 130 to edit one or more preferences associated with the workload-specific dashboard 110 (e.g., via the preferences button 120). In this example, the preferences edited by the system administrator are communicated to the dashboard generator 130 via the user interface engine 160.

The database 124 may comprise any combination of physical and logical structures as is ordinarily used for database systems, such as Hard Disk Drives (HDDs), Solid State Drives (SSDs), logical partitions, and the like. The database 124 is illustrated as a single database containing observed workload data 126 and workload profile(s) 128 that is associated with the dashboard generator 130. However, the database 124 may be associated with a cluster that is separate and distinct from the dashboard generator 130. Further, the database 124 may be accessible via a remote server or the database 124 may include multiple separate databases that contain some portion of the observed workload data 126 and/or workload profile(s) 128.

In various embodiments, the dashboard generator 130 may be associated with or operate on one or more clusters of nodes, such that the computer system 102 is an emulated computer system supported by a node included in a networked virtualization system. In embodiments in which the computer system 102 is an emulated computer system supported by a node, the dashboard generator 130 may analyze each node or each cluster of nodes separately. Furthermore, in such embodiments, one or more clusters may interface with one or more databases, such as database 124, that contain locations for storing or retrieving relevant observed workload data 126 or workload profile(s) 128. In one embodiment, the dashboard generator 130 is a management application or is part of a management application that may be used to manage one or more clusters and allows the dashboard generator 130 to interface with the one or more clusters or provides a means for operating the dashboard generator 130. For instance, the management application may allow the dashboard generator 130 to access one or more databases on one or more clusters for retrieval and storage of observed workload data 126. Embodiments in which the computer system 102 is emulated computer system supported by a node included in a networked virtualization system are further described below in conjunction with FIGS. 5A-7.

Some embodiments may be implemented on one or more management consoles, user stations, or other devices that include any type of computing station that may be used to operate or interface with the dashboard generator 130. Examples of such management consoles, user stations, and other devices include, for example, workstations, personal computers, servers, or remote computing terminals. Management consoles may also include one or more input devices for a user to provide operational control over the activities of the dashboard generator 130, such as a mouse or keyboard to manipulate a pointing object in a graphical user interface. The dashboard generator 130 may operate on a management console for a plurality of systems or may operate on one or more management consoles distributed across the systems. Further details regarding methods and mechanisms for implementing the dashboard generator illustrated in FIG. 1 are described in U.S. Pat. No. 8,601,473, issued on Dec. 3, 2013, which is hereby incorporated by reference in its entirety.

Figure 2A:
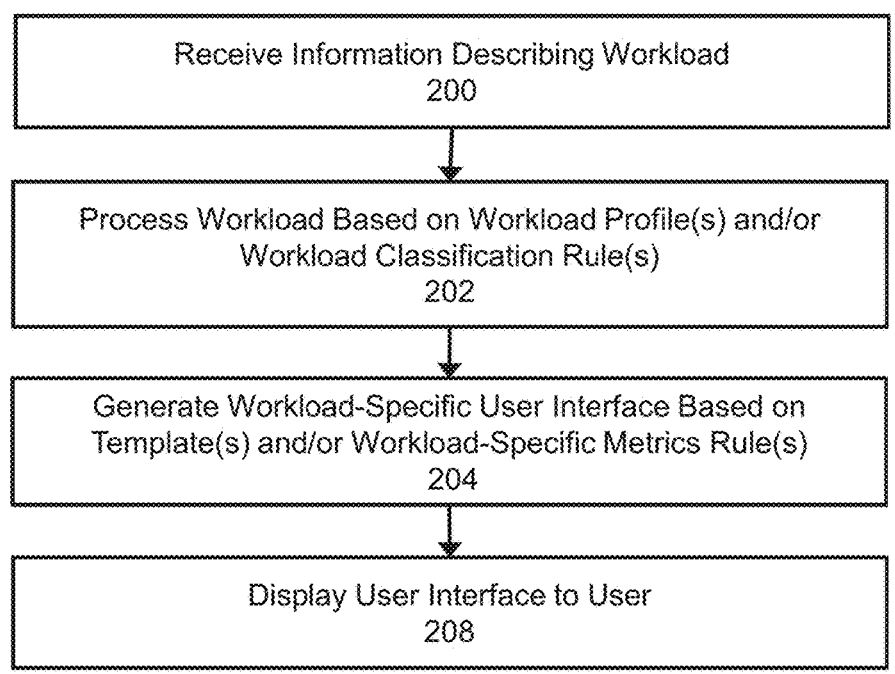
FIG. 2A is a flowchart for displaying a workload-specific user interface to a user of a computer system according to some embodiments of the invention.
Figure 2B:
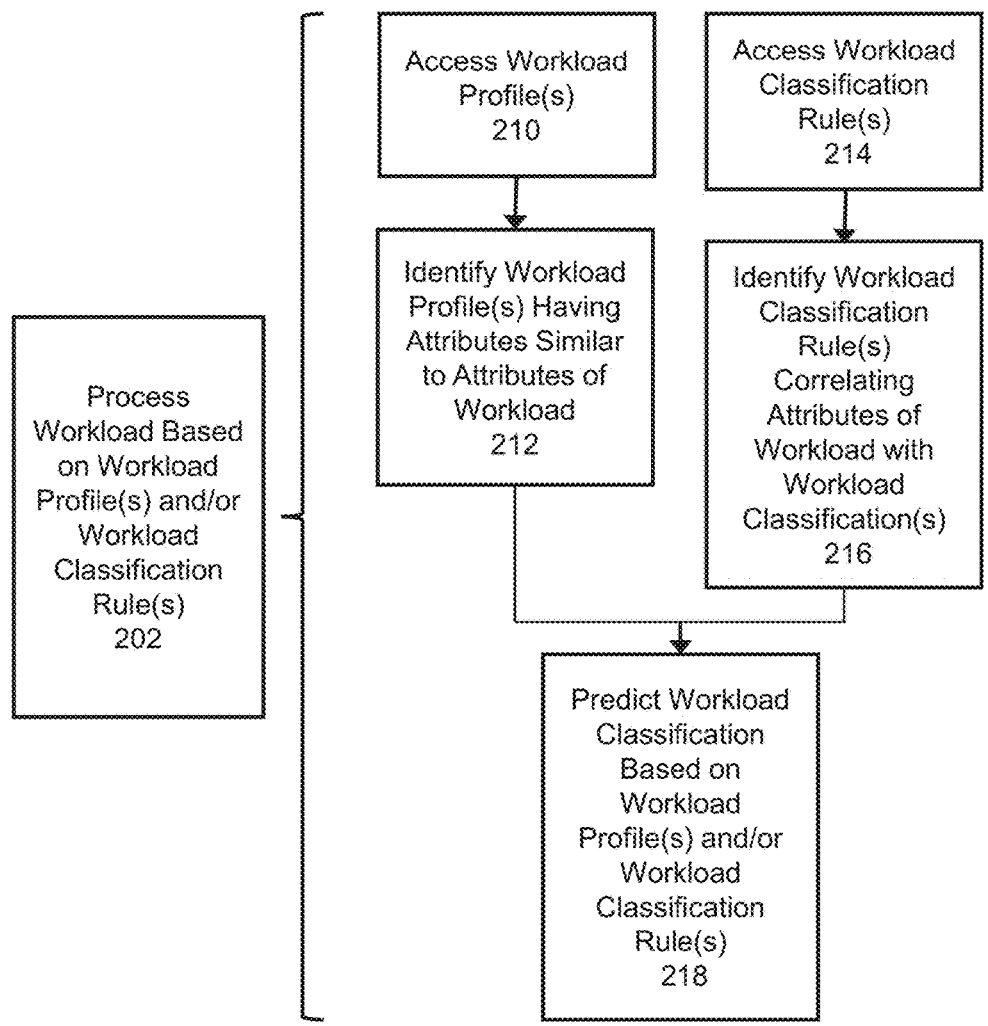
FIG. 2B is a flowchart for processing a workload of a computer system based on a set of workload profiles and/or a set of classification rules according to some embodiments of the invention.
Figure 2C:
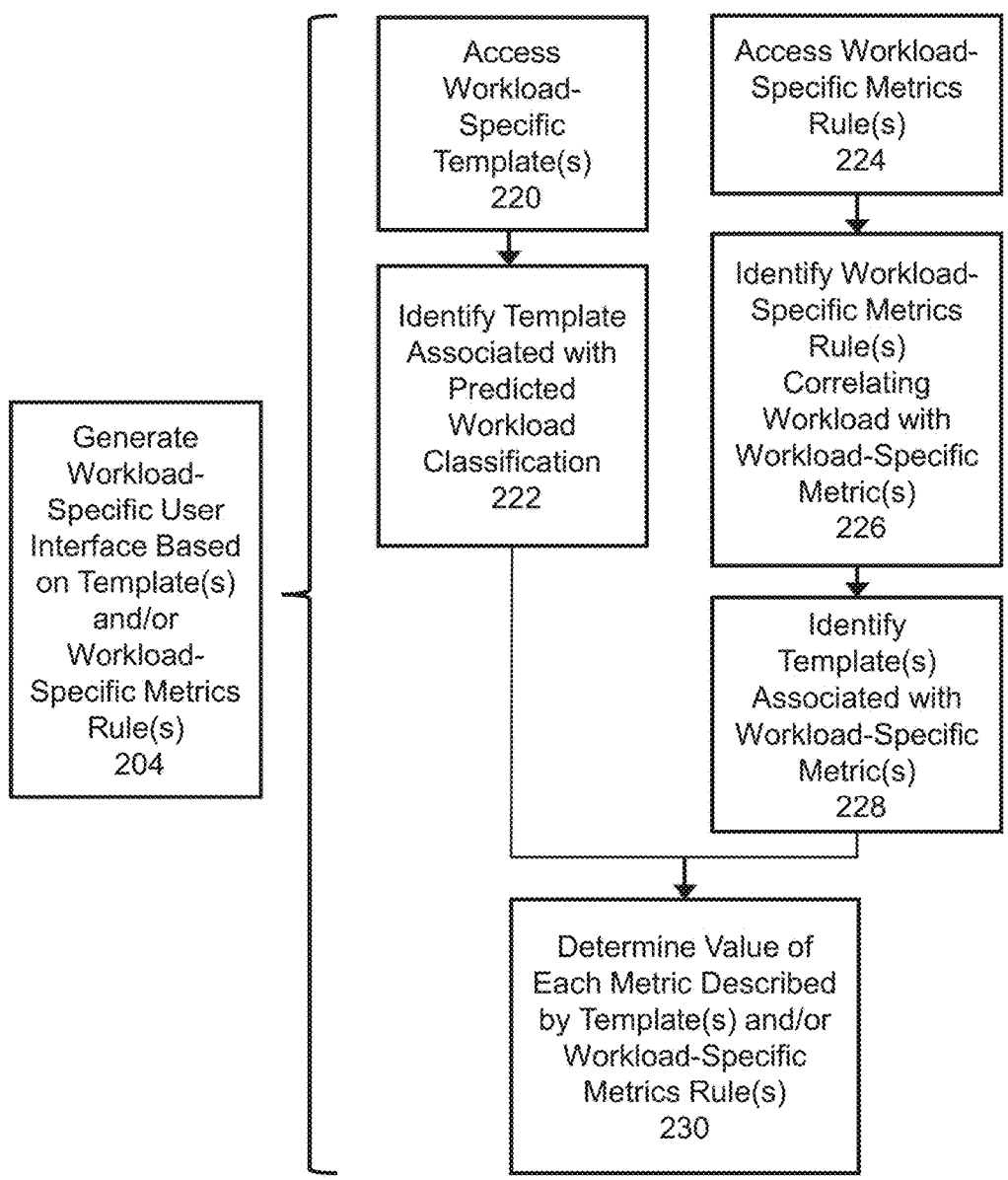
FIG. 2C is a flowchart for generating a workload-specific user interface based on a set of templates and/or a set of workload-specific metrics rules according to some embodiments of the invention.

FIG. 2A is a flowchart for displaying a workload-specific user interface to a user of a computer system according to some embodiments of the invention. FIG. 2B is a flowchart for processing a workload of a computer system based on a set of workload profiles and/or a set of classification rules according to some embodiments of the invention. FIG. 2C is a flowchart for generating a workload-specific user interface based on a set of templates and/or a set of workload-specific metrics rules according to some embodiments of the invention. Some of the steps illustrated in these flowcharts are optional in different embodiments. In some embodiments, the steps may be performed in an order different from that described in FIGS. 2A-2C.

Referring first to FIG. 2A, the flowchart begins when the dashboard generator 130 receives 200 information describing a workload of the computer system 102. The information describing the workload may be received 200 by the dashboard generator 130 at the workload classification module 122. This information may include one or more types of attributes that characterize the workload. In some embodiments, an attribute of a workload may describe the utilization of one or more computing resources required to process the workload. For example, a particular workload may require utilization of a specific amount of RAM and storage available on the computer system 102. Another attribute of the workload may describe an input/output pattern. For example, a workload may be characterized by a particular ratio of reads to writes performed randomly (rather than sequentially) on a particular number of blocks of data on a disk drive. Additionally, an attribute that may characterize the workload may include an identifier that is associated with the computer system 102. For example, if the computer system 102 is an emulated computer system (e.g., a virtual machine), a name may be assigned to the emulated computer system based on a naming convention that describes a classification of workload to be processed using the emulated computer system. In this example, a name containing "SQL" or "DB" may be assigned by a system administrator to an emulated computer system that is to be used for processing database workloads using Microsoft SQL.

The information describing the workload of the computer system 102 may be received 200 at the workload classification module 122 of the dashboard generator 130 in various ways. In some embodiments, the workload classification module 122 receives 200 the information describing the workload of the computer system 102 automatically, absent a request sent by the dashboard generator 130 to the computer system 102. Alternatively, the dashboard generator 130 may submit a request for the information describing the workload of the computer system 102 (e.g., periodically); this information is then received 200 at the workload classification module 122 in response to the request. In some embodiments, upon receiving 200 the information describing the workload of the computer system 102, the workload classification module 122 may store the information describing the workload of the computer system 102 (e.g., as observed workload data 126 in a database 124) for subsequent retrieval.

Once the information describing the workload of the computer system 102 has been received 200, the workload classification module 122 may process 202 the workload based on a set of workload profiles 128 and/or based on a set of workload classification rules. As illustrated in FIG. 2B, to process 202 the workload, the workload classification module 122 may first access 210 one or more stored workload profiles 128 (e.g., from the database 124). A workload profile 128 may describe one or more or attributes that generally characterize a given classification of workload. For example, a workload profile 128 for a database workload may be characterized by a high read/write ratio and usage of high amounts of CPU and RAM. Attributes associated with workload profiles 128 may be described in terms of ranges (e.g., between 200 to 300 MB of memory), thresholds (e.g., less than 10% CPU), ratios or percentages (e.g., 75% of available GPU), patterns (e.g., random or sequential access patterns), relative quantities (e.g., high or low storage usage), etc.

The workload classification module 122 may then identify 212 a set of workload profiles 128 based on one or more attributes associated with the workload being processed by the computer system 102 and attributes associated with the workload profiles 128. In some embodiments, each workload profile 128 identified 212 by the workload classification module 122 is associated with one or more attributes having at least a threshold measure of similarity to one or more attributes associated with the workload being processed by the computer system 102. For example, if the workload being processed by the computer system 102 is characterized by a low read/write ratio and a workload profile 128 for an EUC workload is characterized by an input/output pattern that includes a low read/write ratio, the workload classification module 122 may determine that the attributes characterizing the EUC workload has at least a threshold measure of similarity to the attributes associated with the workload being processed by the computer system 102. In this example, the workload profile 128 for the EUC workload is included as among the set of workload profiles 128 identified 212 by the workload classification module 122. In the previous example, if a workload profile 128 for a database workload is characterized by an input/output pattern that includes a high read/write ratio, the workload classification module 122 may determine that the attributes characterizing the database workload do not have at least a threshold measure of similarity to the attributes associated with the workload being processed by the computer system 102. Therefore, in this example, the workload profile 128 for the database workload is not included as among the set of workload profiles 128 identified 212 by the workload classification module 122.

Based on the set of workload profiles 128 identified 212 by the workload classification module 122, the workload classification module 122 may then predict 218 a classification of the workload being processed by the computer system 102. In some embodiments, the workload classification module 122 may predict 218 the classification of the workload by comparing the attributes described by each identified 212 workload profile 128 with the attributes describing the workload being processed by the computer system 102. For example, the workload classification module 122 compares the attributes described by each identified 212 workload profile 128 and the attributes describing the workload being processed by the computer system 102. Based on the comparisons, the workload classification module 122 identifies a workload profile 128 associated with attributes that have the greatest measure of similarity to the attributes of the workload being processed by the computer system 102 and predicts 218 that the classification of the workload is the same as that described by this workload profile 128.

In various embodiments, the workload classification module 122 may include a machine-learning module 123 that trains one or more machine-learned models 125 to predict 218 a classification of the workload being processed by the computer system 102. The machine-learning module 123 may train a machine-learned model 125 to predict 218 a classification of the workload using an algorithm based on a set of training data that may be retrieved from the database 124. For example, suppose the training data includes observed workload data 126, in which each instance of the observed workload data 126 has been verified to be of a particular classification (e.g., by the user of the computer system 102). In this example, the machine-learning module 123 may then use the training data to train a model 125 based on correlations between different combinations of attributes characterizing the instances and the classifications of workloads to which the instances belong. The workload classification module 122 may then use the machine-learned model 125 to predict 218 a classification of a new instance of a workload. In such embodiments, the machine-learned model 125 may be retrained periodically (e.g., once every week) or upon the occurrence of an event (e.g., upon receipt of a new set of training data).

Alternatively, in some embodiments, rather than training one or more machine-learned models 125 to predict 218 a classification of the workload being processed by the computer system 102, the workload classification module 122 may predict 218 the classification of the workload based on a set of workload classification rules. In such embodiments, the rule engine 140 may access 214 various workload classification rules stored in the rule store 142. Each workload classification rule may associate various attributes that may characterize the workload being processed by the computer system 102 with a classification of workload, such that different combinations of attributes correspond to different classifications of workloads.

Figure 3A:
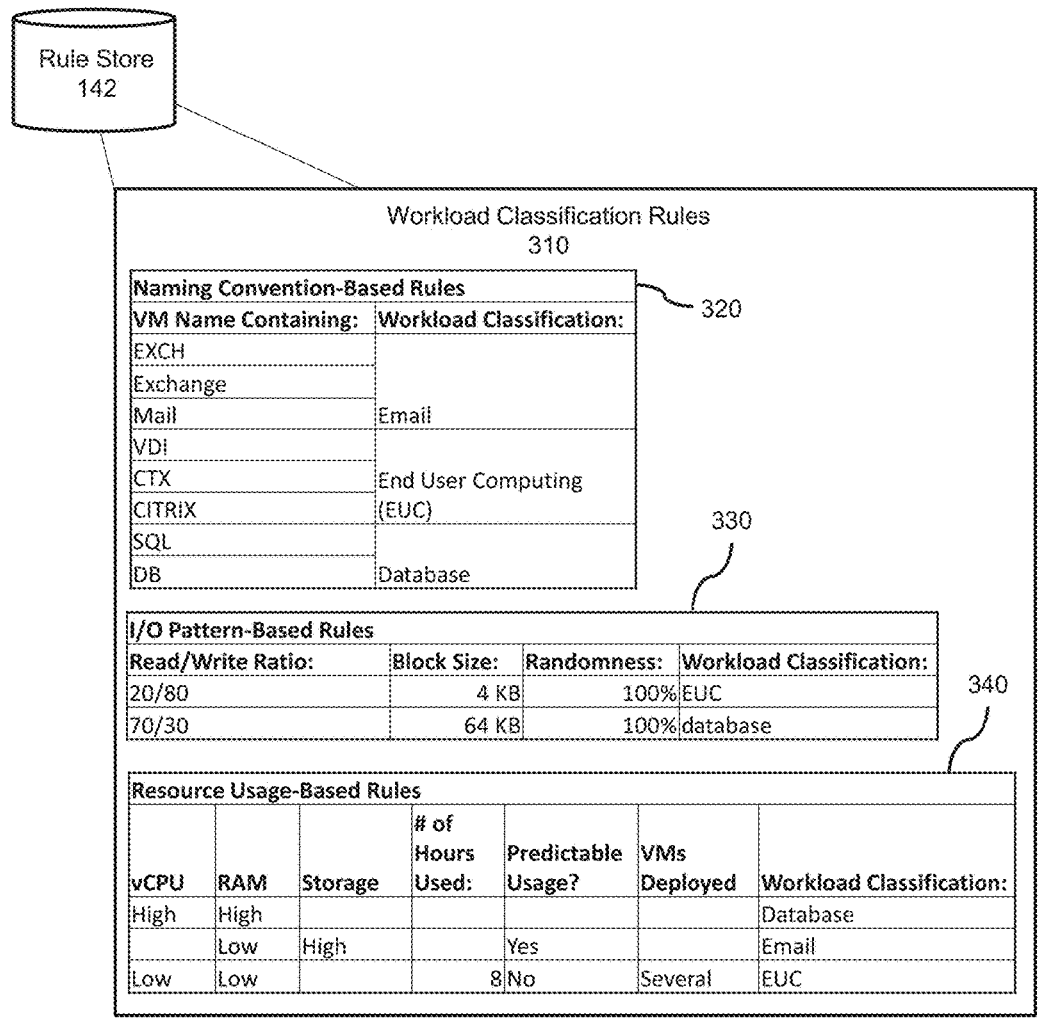
FIG. 3A illustrates examples of workload classification rules according to some embodiments of the invention.

As shown in the example of FIG. 3A, workload classification rules 310 may be used to classify workloads based on naming conventions (e.g., based on a name or other identifier that is associated with the computer system 102). For example, as shown in table 320, if the computer system 102 is an emulated computer system (e.g., a virtual machine), a name may be assigned to the emulated computer system based on a naming convention that describes a classification of workload to be processed using the emulated computer system. In this example, a name containing "VDI," "CTX," or "CITRIX" may be assigned by a system administrator to an emulated computer system that is to be used for processing EUC workloads using Citrix XenDesktop. Workload classification rules may also be used to classify workloads based on input/output patterns of the workloads. For example, as shown in table 330, a workload may be characterized by a particular ratio of reads to writes performed randomly (rather than sequentially) on a particular number of blocks of data on a disk drive. Additionally, workload classification rules may be used to classify workloads based on resource usage by the workloads. For example, as shown in table 340, a particular workload may be characterized by predictable or unpredictable utilization of specific computing resources (e.g., vCPU, RAM, or storage) for a specified duration of time on a number of virtual machines. For illustrative purposes, FIG. 3A shows three types of workload classification rules 310, that may be used to classify three different types of workloads. However, in various embodiments, the rule store 142 may include more or fewer types of workload classification rules 310, which may be used to classify more or fewer types of workloads than depicted in FIG. 3A. Furthermore, the workload classification rules 310 may be expressed as if-then statements (e.g., "if vCPU usage is at least X and RAM usage is at least Y, then workload classification=Z") or using any other suitable format.

Referring back to FIG. 2B, once the rule engine 140 has accessed 214 one or more workload classification rules 310 stored in the rule store 142, the rule engine 140 may then identify 216 a set of workload classification rules 310 that are used by the workload classification module 122 to predict 218 the classification of the workload being processed by the computer system 102. For example, the rule engine 140 may receive information from the workload classification module 122 describing one or more attributes (e.g., input/output pattern, resource usage, etc.) that characterize the workload being processed by the computer system 102; based on the attributes, the rule engine 140 may identify 216 a set of workload classification rules 310 stored in the rule store 142 that correlate the attributes of the workload with one or more classifications of workloads. In this example, the workload classification module 122 may then use the set of workload classification rules 310 identified 216 by the rule store 142 to predict 218 a classification of the workload. For example, if a majority of the set of workload classification rules 310 identified 216 by the rule engine 140 correlate the attributes of the workload with an email workload, the workload classification module 122 predicts 218 that the classification of the workload is also an email workload. Once the workload classification module 122 has predicted 218 the classification of the workload being processed by the computer system 102, processing 202 of the workload is complete.

Referring back to FIG. 2A, once the workload classification module 122 has completed processing 202 the workload of the computer system 102, the dashboard generator 130 may generate 204 a user interface (i.e., a workload-specific dashboard 110) that is specific to the predicted 218 classification of the workload. The user interface may be generated 204 by the dashboard generator 130 based on a set of templates and/or based on a set of workload-specific metrics rules. As illustrated in FIG. 2C, to generate 204 the user interface, the template identification module 144 may first access 220 one or more stored templates stored in the template store 145. The templates stored in the template store 145 may associate different classifications of workloads with different combinations of metrics, such that each classification of workload is associated with a set of metrics that are likely to be relevant to the classification of workload. For example, a template for an EUC workload may be associated with metrics including vCPU/pCPU ratio, CPU ready times, and GPU usage. In some embodiments, templates may be stored in the template store 145 in association with additional types of information. For example, a template may be stored in association with user identifying information (e.g., user login credentials) that are associated with a particular user of the computer system 102 and a date/time (e.g., a date that the template was stored in the template store 145 or updated).

A template may specify one or more ways in which each metric described by the template may be expressed or displayed in the workload-specific dashboard 110 (e.g., according to a particular format, using a particular unit of measurement, etc.). In some embodiments, a template may specify how a metric may be expressed numerically. For example, a template may specify that a metric describing GPU usage may be expressed as a ratio or as a percentage. A template may also specify a unit that may be used to express a metric. For example, a template may specify that a metric describing CPU ready time may be expressed in units of milliseconds. Furthermore, a template may specify a format that may be used to display a metric. For example, a template may specify that a metric describing RAM usage may be displayed graphically as a pie chart or as a line graph as a function of time.

Figure 4A:
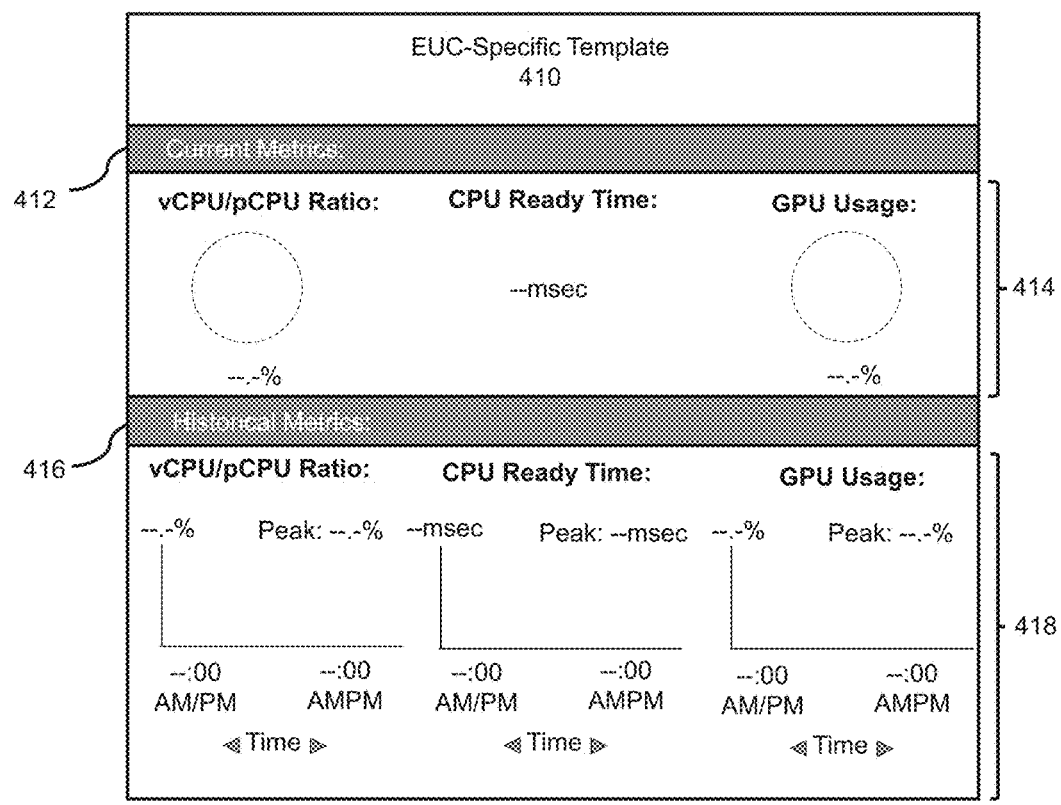
FIG. 4A illustrates an example template specific to end-user computing workloads according to some embodiments of the invention.
Figure 4B:
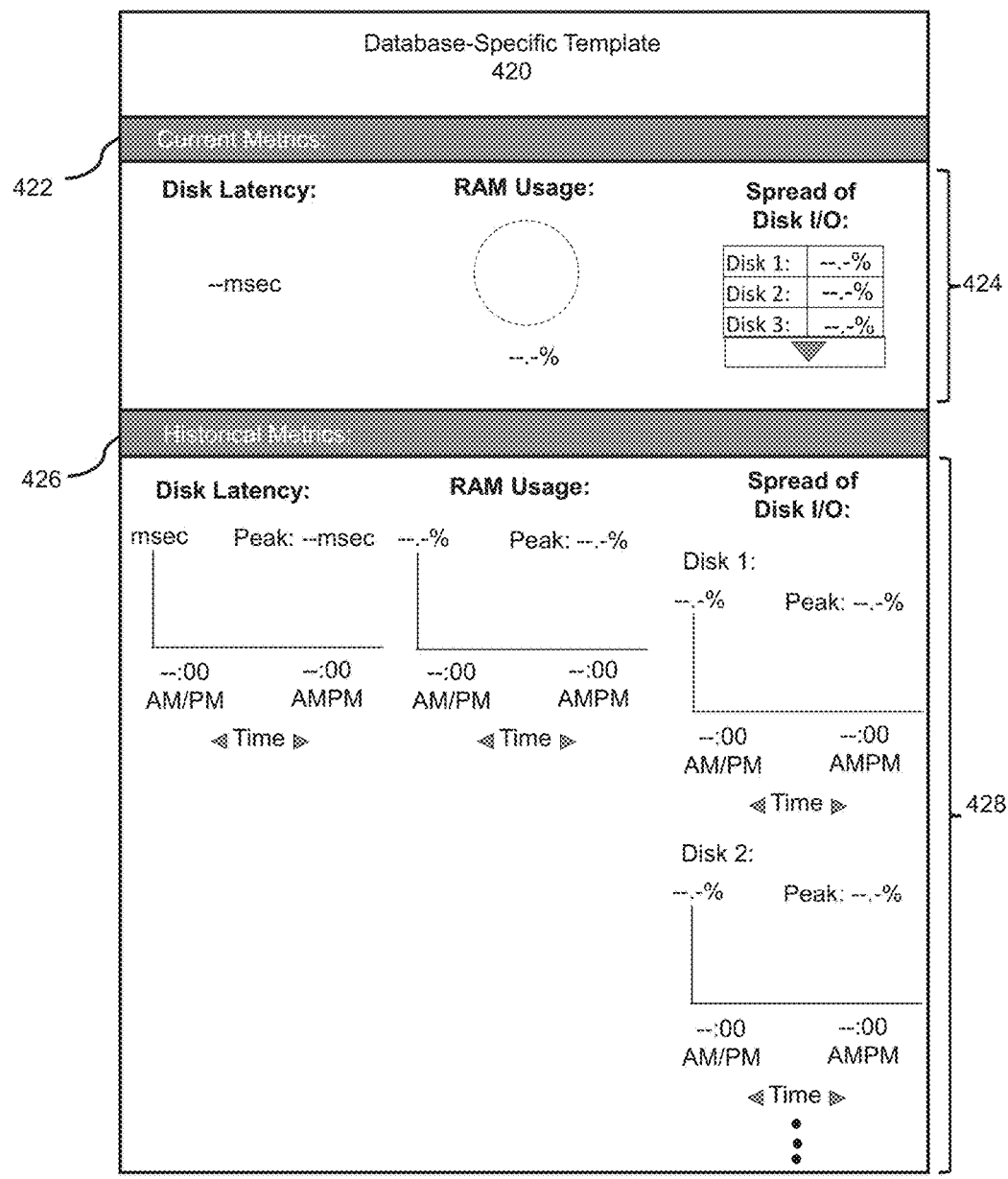
FIG. 4B illustrates an example template specific to database workloads according to some embodiments of the invention.
Figure 4C:
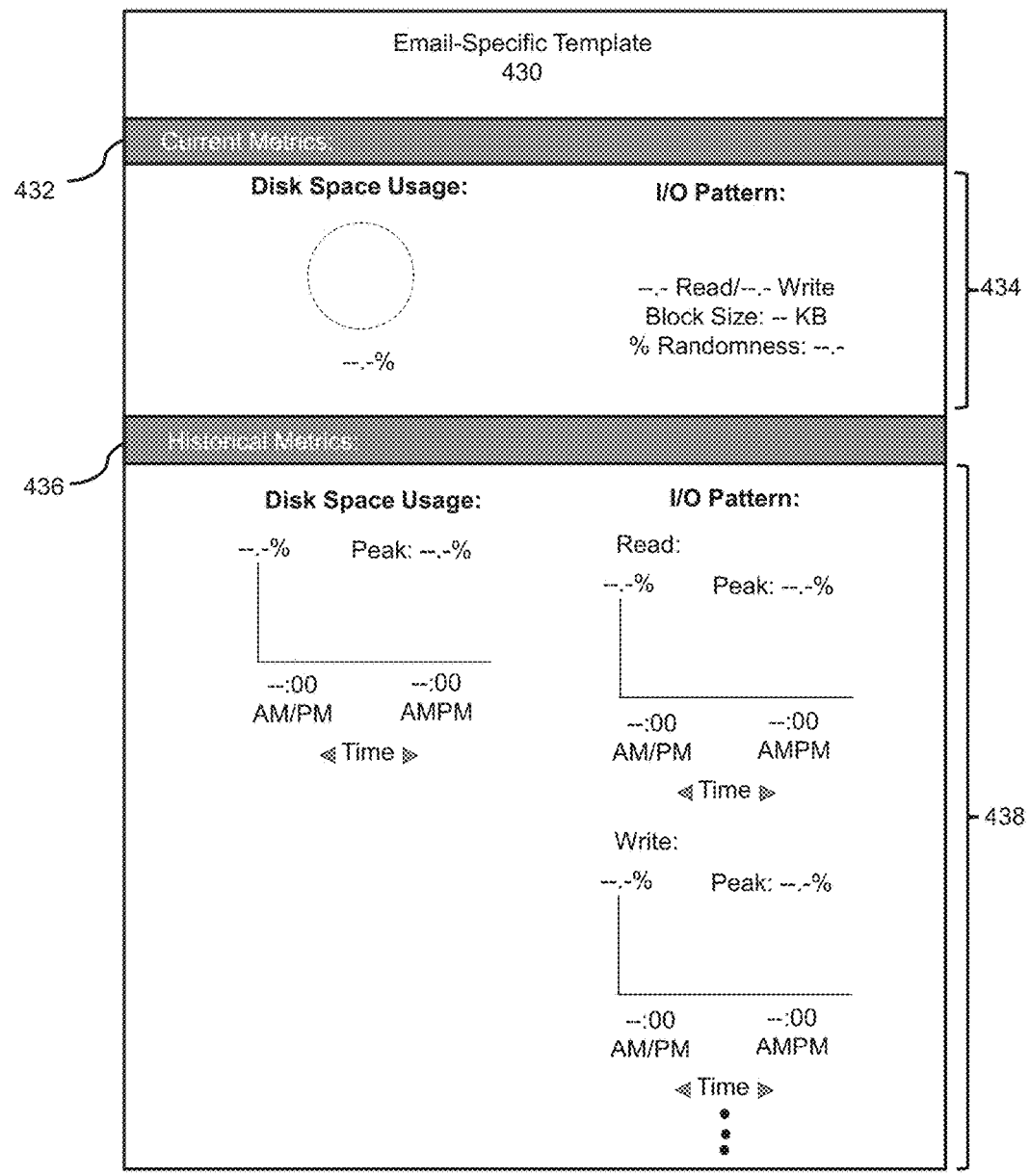
FIG. 4C illustrates an example template specific to email workloads according to some embodiments of the invention.

As illustrated in the examples of FIGS. 4A-4C, in some embodiments, a template may specify how both current and historical metrics described by the template may be expressed or displayed. Referring first to FIG. 4A, a template 410 that is specific to an EUC workload may describe current metrics 412 and historical metrics 416 such as vCPU/pCPU ratio, CPU ready time, and GPU usage. In this example, the EUC-specific template 410 may specify that the current vCPU/pCPU ratio and GPU usage 414 should be expressed numerically as percentages and displayed graphically as pie charts and that the current CPU ready time should be expressed numerically in milliseconds. The EUC-specific template 410 may also specify that all three historical metrics 416 should be displayed graphically as line graphs 418 that plot the metrics as a function of time using the same units as the current metrics 412.

In the example of FIG. 4B, a template 420 that is specific to a database workload may describe current metrics 422 and historical metrics 426 such as disk latency, RAM usage, and spread of disk input/output across multiple disks. In this example, the database-specific template 420 may specify that disk latency should be expressed numerically in milliseconds, that RAM usage should be expressed numerically as a percentage and displayed graphically as a pie chart, and that the spread of disk input/output should be displayed in a table 424. The database-specific template 420 may also specify that all three historical metrics 426 should be displayed graphically as line graphs 428 that plot the metrics as a function of time using the same units as the current metrics 422.

As shown in FIG. 4C, a template 430 that is specific to an email workload may include current metrics 432 and historical metrics 436 such as disk space usage and input/output patterns. In this example, the database-specific template 430 may specify that the disk space usage should be expressed numerically as a percentage and displayed graphically as a pie chart and that and the input/output pattern should be expressed numerically as percentages and in units of kilobytes 434. The email-specific template 430 may also specify that both historical metrics 436 should be expressed as line graphs 428 that plot the metrics as a function of time using the same units as the current metrics 432.

Although the information in the workload-specific templates shown in FIGS. 4A-4C is displayed graphically using pie charts, tables, and line graphs, in various embodiments, the information may be displayed in graphical formats other than those depicted in FIGS. 4A-4C (e.g., bar graphs, scatter plots, etc.).

Referring back to FIG. 2C, once the template identification module 144 has accessed 220 the stored templates from the template store 145, the template identification module 144 may then identify 222 a template associated with the predicted 218 classification of the workload being processed by the computer system 102. For example, if the predicted 218 classification of the workload being processed by the computer system 102 is a database workload and a template stored in the template store 145 accessed by the template identification module 144 is for a database workload, this template is identified 222 by the template identification module 144. In the previous example, if the templates stored in the template store 145 also include a template for an email workload, this template is not identified 222 by the template identification module 144.

In some embodiments, in addition to the classification of the workload predicted by the workload classification module 122, the template identification module 144 may also identify 222 the template associated with the predicted 218 classification of the workload being processed by the computer system 102 for a particular user of the computer system 102. For example, the information describing the workload of the computer system 102 received 200 at the workload classification module 122 may include information identifying a user of the computer system 102, such as a user name or a login ID. In this example, this information may be communicated to the template identification module 144 along with the classification of the workload predicted 218 by the workload classification module 122. Based on this information, the template identification module 144 may identify 222 a template that not only describes one or more metrics that are likely to be relevant to the predicted 218 classification of workload, but which is also stored in the template store 145 in association with information identifying the user.

Based on the identified 222 template, the user interface engine 160 of the workload classification module 122 may generate 204 a workload-specific user interface (i.e., a workload-specific dashboard 110) that includes one or more metrics specific to the predicted 218 classification of the workload being processed by the computer system 102. In some embodiments, to generate 204 the workload-specific user interface 110, the dashboard generator 130 may first determine 230 a value of each metric described by the identified 222 template. For example, if the template identified 222 by the template identification module 144 is an email-specific template that includes metrics describing disk space usage and input/output patterns, the user workload classification module 122 may determine 230 the percentage of disk space used and input/output patterns of the workload being processed by the computer system 102 based on the information received 200 from the computer system 102 describing the workload. In this example, the user interface engine 160 may then generate 204 the workload-specific dashboard 110 that includes the percentage of disk space used and the input/output patterns of the workload expressed in the units and format specified by the identified 222 template.

Figure 3B:
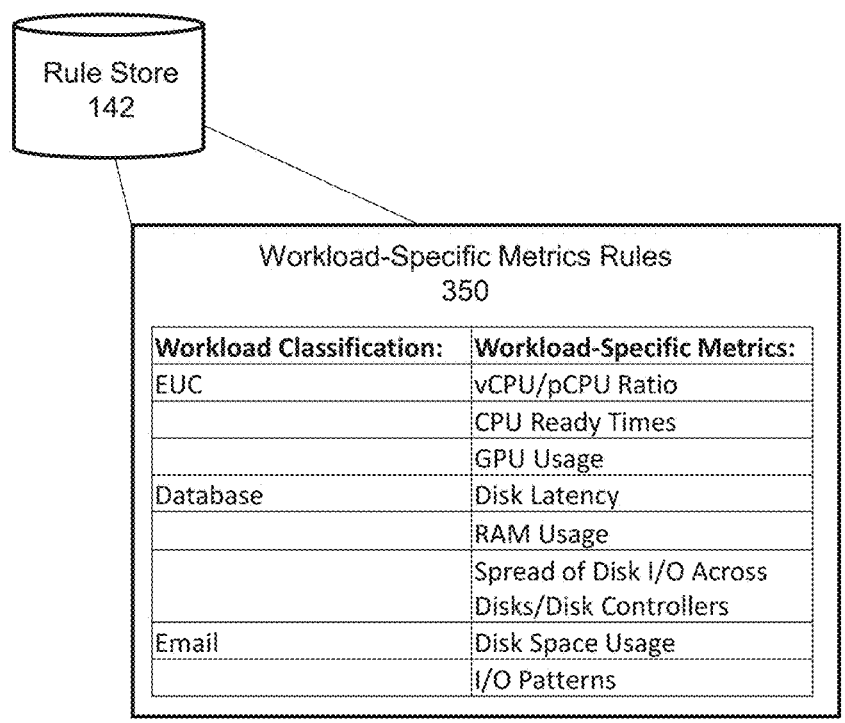
FIG. 3B illustrates examples of workload-specific metrics rules according to some embodiments of the invention.

In some embodiments, the user interface engine 160 may alternatively or additionally generate 204 the workload-specific user interface based on a set of workload-specific metrics rules. In such embodiments, the rule engine 140 may access 224 one or more workload-specific metrics rules stored in the rule store 142. As shown in the example of FIG. 3B, workload-specific metrics rules 350 may associate various combinations of metrics that are most likely to be relevant to different classifications of workload with those classifications of workloads. For example, a workload-specific metrics rule 350 associates email workloads with metrics describing disk space usage and input/output patterns, since these metrics are most likely to be relevant to this classification of workload. For illustrative purposes, FIG. 3B shows workload-specific metrics rules 350 for three classifications of workloads. However, in various embodiments, the rule store 142 may include more or fewer types of workload-specific metrics rules 350, which may associate more or fewer types of workload-specific metrics with more or fewer classifications of workloads than depicted in FIG. 3B.

Referring back to FIG. 2C, once the rule engine 140 has accessed 224 the workload-specific metrics rules 350 stored in the rule store 142, the rule engine 140 may then identify 226 a set of workload-specific metrics rules 350 that are used by the template identification module 144 to identify 228 one or more templates from the template store 145. For example, the rule engine 140 may receive information from the workload classification module 122 describing the predicted 218 workload classification of the workload being processed by the computer system 102; based on the predicted 218 workload classification, the rule engine 140 may identify 226 a set of workload-specific metrics rules 350 stored in the rule store 142 that correlate the predicted 218 classification of workload with one or more metrics. In this example, the template identification module 144 may then use the set of the workload-specific metrics rules 350 identified 226 by the rule engine 140 to identify 228 one or more templates from the template store 145.

In some embodiments, the template identification module 144 may identify 228 multiple templates that each include a metric that is relevant to the classification of workload predicted 218 by the workload classification module 122. In such embodiments, each template may be identified 228 by the template identification module 144 based on one or more workload-specific metrics rules 350 stored in the rule store 142, such that each template includes a metric that is relevant to the predicted 218 classification of the workload. The workload classification module 122 may then determine 230 the value of each metric described by the identified 228 templates, as described above, which is used by the user interface engine 160 to generate 204 the workload-specific dashboard 110.

Referring once more to FIG. 2A, once the user interface engine 160 has generated 204 the user interface (i.e., a workload-specific dashboard 110) that is specific to the predicted 218 classification of the workload, the user interface may be displayed 208 to a user of the computer system 102. For example, the workload-specific dashboard 110 may be displayed 208 to the user via a display device, such as a display monitor. In various embodiments, the user interface may include one or more interactive elements with which the user of the computer system 102 may interact. For example, the workload-specific dashboard 110 may include a preferences button 120 that allows the user to set one or more preferences associated with the workload-specific dashboard 110 (e.g., to change a unit used to express a particular metric) if the user clicks on the button 120.

The dashboard generator 130 may perform an action in response to receiving information indicating that the user has interacted with an interactive element included in the user interface. In the above example, in response to receiving the selection from the user (e.g., received via the user interface engine 160), the template update module 147 may update one or more templates in the template store 145 describing the metric to reflect the preferences set by the user. In this example, the updated templates may also be stored in association with user identifying information associated with the user (e.g., user login credentials) and a date/time (e.g., the date and time that the templates were updated to reflect the preferences set by the user).

Figure 5A:
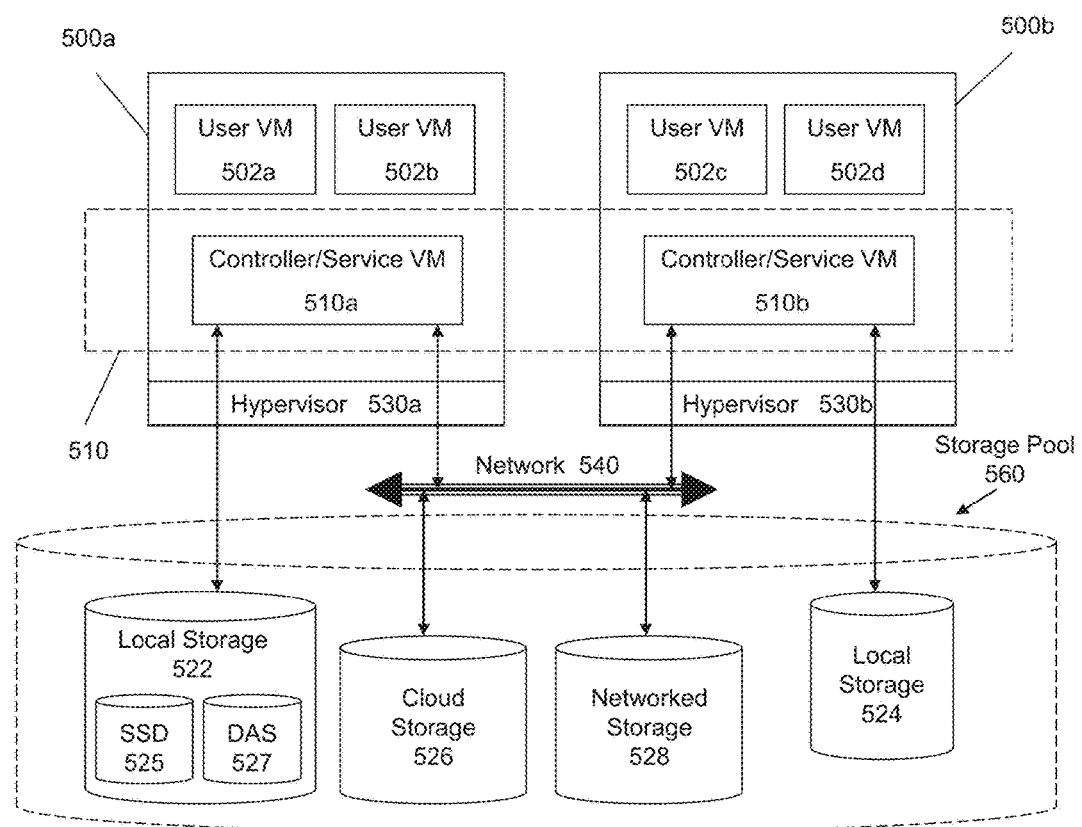
FIG. 5A illustrates an example networked virtualization system according to some embodiments of the invention.

FIG. 5A illustrates a clustered virtualization environment in which some embodiments are implemented. The dashboard generator 130 may operate in a clustered virtualization environment, such as via a management console. Further, information about the cluster may be used as inputs to the dashboard generator 130.

The architecture of FIG. 5A can be implemented for a distributed platform that contains multiple servers 500a and 500b that manages multiple-tiers of storage. The multiple tiers of storage may include storage that is accessible through a network 540, such as cloud storage 526 or networked storage 528 (e.g., a SAN or "storage area network"). Unlike the prior art, the present embodiment also permits local storage 522/524 that is within or directly attached to the server and/or appliance to be managed as part of the storage pool 560. Examples of such storage include Solid State Drives (henceforth "SSDs") 525 or Hard Disk Drives (henceforth "HDDs" or "spindle drives") 527. These collected storage devices, both local and networked, form a storage pool 560. Virtual disks (or "vDisks") can be structured from the storage devices in the storage pool 560, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each server 500a or 500b runs virtualization software, such as VMware ESX(i), Microsoft Hyper-V, or RedHat KVM. The virtualization software includes a hypervisor 530a/530b to manage the interactions between the underlying hardware and the one or more user VMs 502a, 502b, 502c, and 502d that run client software.

A special VM 510a/510b is used to manage storage and I/O activities according to some embodiment of the invention, which is referred to herein as a "Controller/Service VM". This is the "Storage Controller" in the currently described architecture. Multiple such storage controllers coordinate within a cluster to form a single system. The Controller/Service VMs 510a/510b are not formed as part of specific implementations of hypervisors 530a/530b. Instead, the Controller/Service VMs run as virtual machines above hypervisors 530a/530b on the various servers 500a and 500b, and work together to form a distributed system 510 that manages all the storage resources, including the locally attached storage 522/524, the networked storage 528, and the cloud storage 526. Since the Controller/Service VMs run above the hypervisors 530a/530b, this means that the current approach can be used and implemented within any virtual machine architecture, since the Controller/Service VMs of embodiments of the invention can be used in conjunction with any hypervisor from any virtualization vendor.

Each Controller/Service VM 510a-b exports one or more block devices or NFS server targets that appear as disks to the client VMs 502a-d. These disks are virtual, since they are implemented by the software running inside the Controller/Service VMs 510a-b. Thus, to the user VMs 502a-d, the Controller/Service VMs 510a-b appear to be exporting a clustered storage appliance that contains some disks. All user data (including the operating system) in the client VMs 502a-d resides on these virtual disks.

Significant performance advantages can be gained by allowing the virtualization system to access and utilize local (e.g., server-internal) storage 522 as disclosed herein. This is because I/O performance is typically much faster when performing access to local storage 522 as compared to performing access to networked storage 528 across a network 540. This faster performance for locally attached storage 522 can be increased even further by using certain types of optimized local storage devices, such as SSDs 525. Further details regarding methods and mechanisms for implementing the virtualization environment illustrated in FIG. 5A are described in U.S. Pat. No. 8,601,473, issued on Dec. 3, 2013, which is hereby incorporated by reference in its entirety.

Figure 5B:
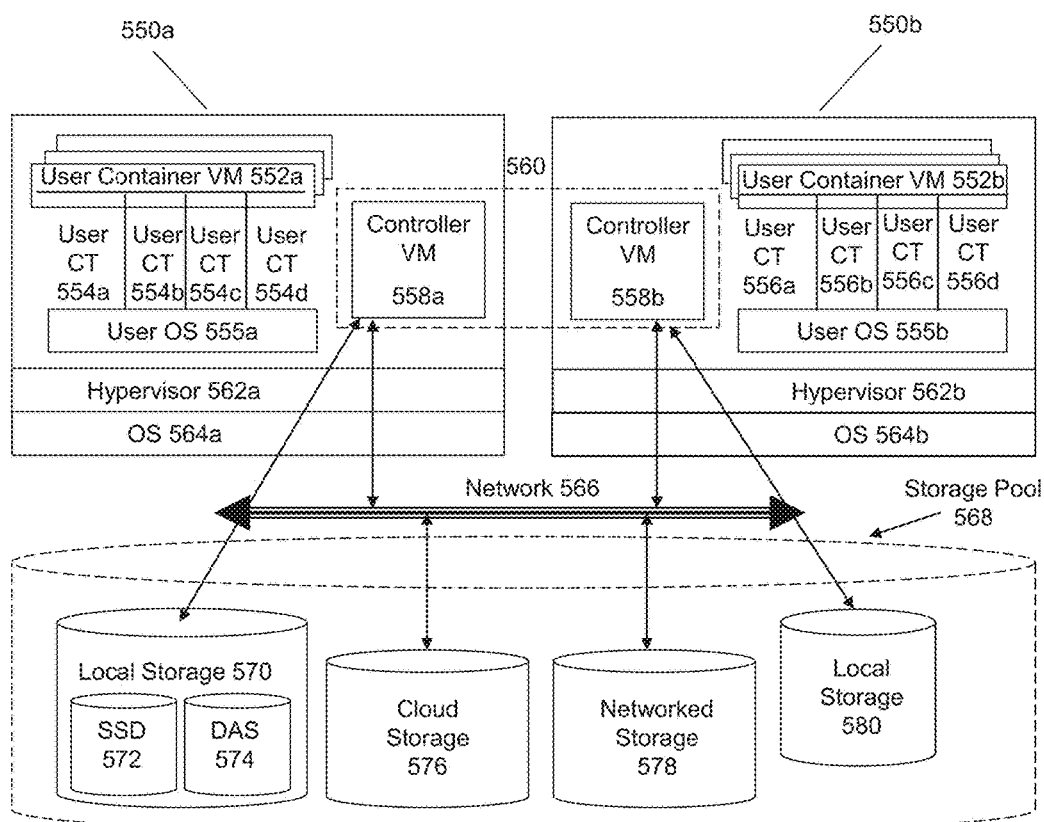
FIG. 5B illustrates an alternative example networked virtualization system according to some embodiments of the invention.

FIG. 5B illustrates an alternative approach for virtualized computing environments using containers. Generally, containers are a type of operating-system level application virtualization, in which the containers run applications in individual execution environments that are isolated from the host operating system and from each other. Some existing systems for running containerized applications include Linux LXC and Docker.

Containers running applications (e.g., containerized applications) have the benefit of being very fast to get up and running because no guest operating system must be installed for the application. The container may interface with the host computer or computers on a network through one or more virtualized network connections, which is managed by a container manager. For example, a web-server container may run a web-server application which is addressed by a IP addressed assigned to the container. To address or access the web-server container, a user or computer may use the IP address, which is intercepted by a container manager and routed to the container. Because the container is isolated from the host operating system, such as if the container application is compromised (e.g., hacked), the malicious entity doing the hacking will be trapped inside the container. However, to increase security, a containerized system may be implemented within a virtual machine. In this way, containerized applications can be quickly modified/updated within the container execution environment, and if one or more of the containers is breached, it will not affect the physical host computer because the container execution environment is still behind a virtual machine.

In FIG. 5B, an approach is illustrated for running containers within a distributed storage system, such as the system of FIG. 5A. Though FIG. 5B illustrates a particular architecture involving a controller virtual machine and user virtual machine which has user containers, one of ordinary skill in the art appreciates that other configurations may be implemented as well. Other approaches, and configurations are discussed in U.S. Application No. 62/171,990, filed on Jun. 5, 2015, which is hereby incorporated by reference in its entirety.

In FIG. 5B, a distributed platform contains multiple servers 550a and 550b that manage multiple-tiers of storage. In some embodiments, the servers 550a and 550b are physical machines with hardware layer such as memory or processors (not depicted) upon which an operating system may be installed. The managed multiple tiers of storage include storage that is accessible through a network 566, such as cloud storage 576 or networked storage 578 (e.g., a SAN or "storage area network"). Additionally, the present embodiment also permits local storage 570 and/or 580 that is within or directly attached to the server and/or appliance to be managed as part of the storage pool 568. Examples of such storage include SSDs 572, HDDs, "spindle drives," or other types of local storage that is directly attached (e.g., direct attached storage, DAS 574). These storage devices, both local and networked, collectively form a storage pool 568. Virtual disks (or "vDisks") can be structured from the storage devices in the storage pool 568, as described in more detail below. As used herein, the term vDisk refers to the storage abstraction that is exposed by a controller/service VM to be used by a user VM or a user container (CT). In some embodiments, the vDisk is exposed via iSCSI ("internet small computer system interface") or NFS ("network file system") and is mounted as a virtual disk on the user VM.

Each server 550a or 550b runs virtualization software, such as VMware ESX(i), Microsoft Hyper-V, or RedHat KVM. The virtualization software includes a hypervisor 562a-b to manage the interactions between the underlying hardware and the one or more user CTs that run client software, such as containerized applications.

The servers 550a-b may implement virtual machines with an operating system 564a-b that supports containers (e.g., Linux) and VM software, such as hypervisors 562a-b. In particular, as illustrated in FIG. 5A for example, node or server 550a runs a controller VM 558a and a user container VM 552a that runs one or more containers 554a-d from a user OS 555a. Each of the user containers may run a container image that may be layered to appear as a single file-system for that container. For example, a base layer may correspond to a Linux Ubuntu image, with an application execution layer on top; the application execution layer corresponding to a read/write execution environment for applications, such as MySQL, web servers, databases or other applications.

In some embodiments, the controller virtual machines 558a-b are used to manage storage and I/O activities for the user containers 554a-d. The controller virtualized computer is the "Storage Controller" in the currently described architecture. Multiple such storage controllers coordinate within a cluster to form a single-system. The Controller VMs 558a-b are not formed as part of specific implementations of respective hypervisors 562a-b. Instead, each controller VM runs as a virtual machine above its respective hypervisors 562a-b on the various servers 550a and 550b, and work together to form a distributed system 560 that manages all the storage resources, including the locally attached storage 570/580 the networked storage 578, and the cloud storage 576.

Each controller VM 558a-b exports one or more block devices or NFS server targets that appear as disks to the user container VM 552a-b. These disks are virtual, since they are implemented by the software running inside the controller VMs 558a-b. Thus, to the User-Container VMs 552a-b, the controller VMs 558a-b appear to be exporting a clustered storage appliance that contains some disks. All user data (including the operating system) in the user-container VMs 552a-b resides on these virtual disks. The containers run from within the respective user container VMs 552a-b may use the user OSs 555a-b to run isolated containerized directories. Further, each user OS 555a-b may have a container manager installed (e.g., Docker, LXC) to run/manage containers on each respective user container VM 552a-b.

Significant performance advantages can be gained by allowing the virtualization system to access and utilize local (e.g., server-internal) storage 570 as disclosed herein. This is because I/O performance is typically much faster when performing access to local storage 570 as compared to performing access to networked storage 578 across a network 566. This faster performance for locally attached storage 570 can be increased even further by using certain types of optimized local storage devices, such as SSDs 572.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 570. On the other hand, data that does not require fast access or which is accessed infrequently can be stored in the networked storage devices 578 or in cloud storage 576. Further details regarding an exemplary approach for implementing the virtualization environment are described in U.S. Pat. No. 8,601,473, issued on Dec. 3, 2013, which is hereby incorporated by reference in its entirety.

In this way, the security and robustness of a distributed storage system using virtual machines (as illustrated in FIG. 5A) may be combined with efficiency and consistency of a container virtualized computer/application environment.

Figure 6:
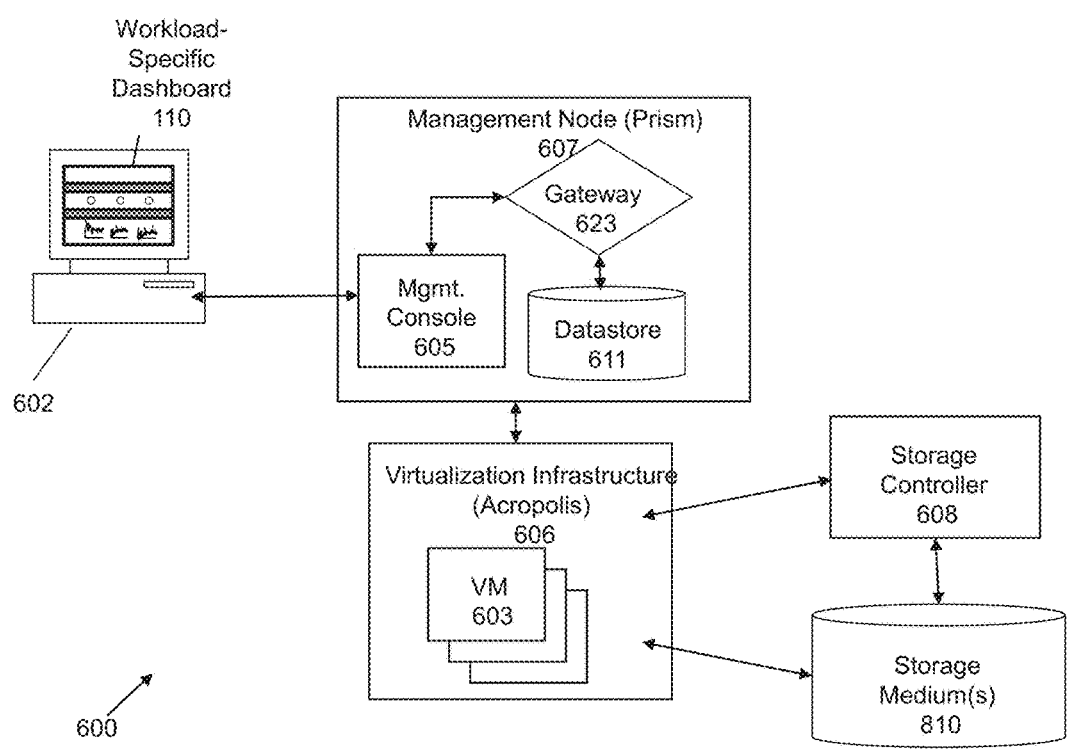
FIG. 6 illustrates a system to implement a virtualization management console according to some embodiments of the invention.

FIG. 6 illustrates a system 600 to implement a virtualization management console 605 according to some embodiments of the invention. In some embodiments, the dashboard generator 130 may operate in a virtualization management console, such as via a management console or on a cluster itself. Further, information for and about one or more clusters may be used as inputs to the dashboard generator 130 such that one or more clusters can be evaluated together.

The system 600 includes one or more users at one or more user stations 602 that use the system 600 to operate the virtualization system 600 and/or management console 605. The user station 602 comprises any type of computing station that may be used to operate or interface with the system 600. Examples of such user stations include, for example, workstations, personal computers, or remote computing terminals. The user station 602 comprises a display device, such as a display monitor, for displaying a user interface (e.g., a workload-specific dashboard 110) to users at the user station. The user station 602 also comprises one or more input devices for the user to provide operational control over the activities of the system 600, such as a mouse or keyboard to manipulate a pointing object in a graphical user interface.

System 600 includes virtualization infrastructure 606, comprising any processing components necessary to implement and provision one or more VMs 603. For example, the virtualization infrastructure 606 may correspond to Nutanix Acropolis. This may include management components to obtain the status of, to configure, and/or to control the operation of one or more storage controllers and/or storage mediums 610. Data for the VMs 603 are stored in a tangible computer readable storage device 610. The computer readable storage device 610 comprises any combination of hardware and software that allows for ready access to the data that is located at the computer readable storage device 610. The storage controller 608 is used to manage the access and operation of the computer readable storage device 610. While the storage controller is shown as a separate component here, it is noted that any suitable storage controller configuration may be employed. For example, in some embodiments, the storage controller can be implemented as a virtual machine as described in more detail below. As noted in more detail below, the virtualization infrastructure 606 may correspond to a cluster of multiple nodes that are integrated as a single system.

System 600 includes a management console 605 included in a management node 607 (e.g., Nutanix Prism). The management console 605 provides an interface that permits an administrator to manage and administer the operation of the system. According to some embodiments, the management console 605 comprises a javascript program that is executed to display a management user interface within a web browser at the user station 602. In some embodiments, the storage controller exposes an API or GUI to create, read, update, delete (CRUD) data stores at the computer readable medium 610, which can be managed by the management console 605.

In operation in some embodiments, a web browser at the user station 602 is used to display a web-based user interface for the management console. The management console 605 corresponds to javascript code to implement the user interface. Metadata regarding the system 600 is maintained at a data store 611, which collects data relating to the virtualization infrastructure 606, the storage mediums 610, and/or datastores at the storage mediums. The javascript code interacts with a gateway 623 to obtain the metadata to be displayed in the user interface. In some embodiments, the gateway comprises a web server and servlet container, e.g., implemented using Apache Tomcat. Further details regarding methods and mechanisms for implementing virtualization management console illustrated in FIG. 6 are described in U.S. Provisional Patent Application No. 62/108,515, filed on Jan. 27, 2015, which is hereby incorporated by reference in its entirety.

Figure 7:
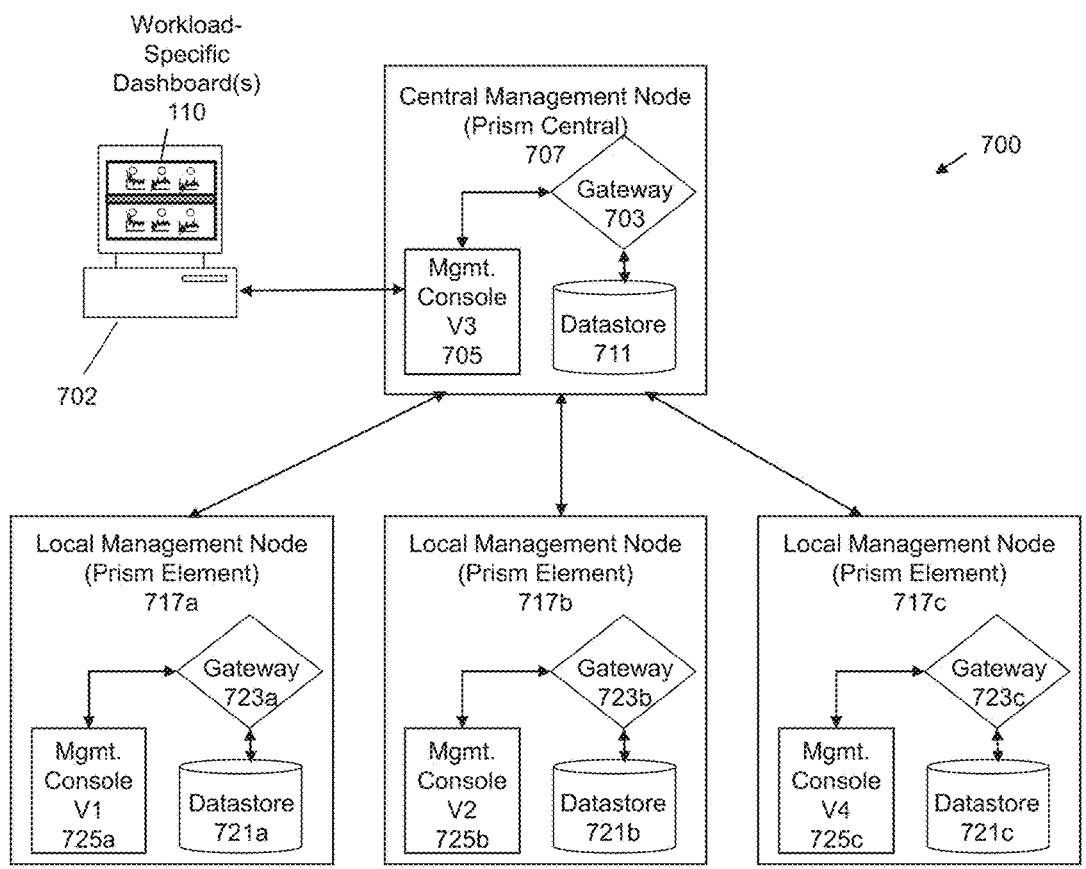
FIG. 7 illustrates a computing environment having multiple underlying systems/clusters to be managed, where a separate management node exists for each of the underlying systems/clusters.

FIG. 7 illustrates a larger computing environment having multiple underlying systems/clusters that need to be managed, where a separate management node exists for each of the underlying systems/clusters.

Similar to FIG. 6, the system 700 includes one or more users at one or more user stations 702 that use the system 700 to operate the virtualization system 700 and/or management console 705. The user station 702 comprises any type of computing station that may be used to operate or interface with the system 700 and a display device, such as a display monitor, for displaying a user interface (e.g., workload-specific dashboard(s) 110) to users at the user station. The user station 702 also comprises one or more input devices for the user to provide operational control over the activities of the system 700, as described above.

The dashboard generator 130 may reside on a central management node 707 for one or more clusters that includes its own management console 705, gateway 703, and datastore 711. Shown here are local management nodes 717a, 717b, and 717c. The central management node 707 and the local management nodes 717a, 717b, and 717c may correspond to Nutanix Prism Central and Nutanix Prism Element, respectively. Each of these management nodes includes its own management console 725a-c, gateway 723a-c, and datastore 721a-c. Further, information for and about one or more clusters may be used as inputs to the dashboard generator 130 such that one or more clusters can be evaluated individually, or all clusters may be evaluated as a whole with the potential of sharing computing resources across multiple nodes. Further details regarding methods and mechanisms for implementing virtualization management console illustrated in FIG. 7 are described in U.S. Provisional Patent Application No. 62/108,515, filed on Jan. 27, 2015, which is hereby incorporated by reference in its entirety.

System Architecture

Figure 8:
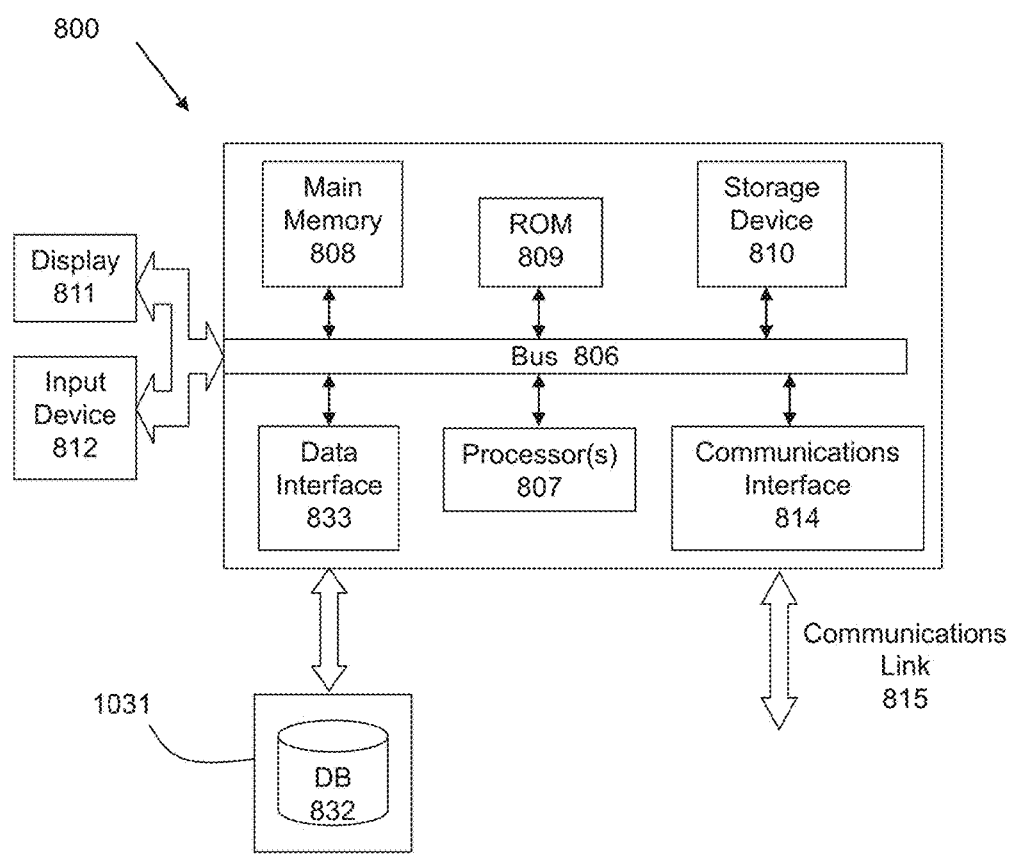
FIG. 8 is a block diagram of a computing system suitable for implementing an embodiment of the present invention.

FIG. 8 is a block diagram of an illustrative computing system 800 suitable for implementing an embodiment of the present invention. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to some embodiments of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 810 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. A database 832 in a storage medium 831 may be used to store data accessible by the system 800.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for generating a workload-specific user interface, the method comprising:
receiving information describing a workload of a computer system, the information comprising an attribute of the workload;

predicting a classification of the workload of the computer system based at least in part on the attribute of the workload, wherein predicting the classification of the workload of the computer system is further based at least in part on a rule describing a correlation between the attribute of the workload and the classification of the workload, the rule describing the correlation between the attribute of the workload and the classification of the workload correlates an identifier associated with the computer system and the classification of the workload;

identifying a template associated with a metric specific to the classification of the workload;

generating a user interface based at least in part on the template, the user interface comprising the metric specific to the classification of the workload; and displaying the user interface comprising the metric specific to the classification of the workload.

2. The method of claim 1, wherein the metric specific to the classification of the workload describes a disk latency, a CPU ready time, or a ratio of virtual CPU to physical CPU.

3. A method for generating a workload-specific user interface, the method comprising:

receiving information describing a workload of a computer system, the information comprising an attribute of the workload;

predicting a classification of the workload of the computer system based at least in part on the attribute of the workload, wherein predicting the classification of the workload of the computer system is further based at least in part on a rule describing a correlation between the attribute of the workload and the classification of the workload, the rule describing the correlation between the attribute of the workload and the classification of the workload correlates an input/output pattern of the workload and the classification of the workload;

identifying a template associated with a metric specific to the classification of the workload;

generating a user interface based at least in part on the template, the user interface comprising the metric specific to the classification of the workload; and displaying the user interface comprising the metric specific to the classification of the workload.

4. The method of claim 3, wherein the metric specific to the classification of the workload describes a disk latency, a CPU ready time, or a ratio of virtual CPU to physical CPU.

5. A method for generating a workload-specific user interface, the method comprising:

receiving information describing a workload of a computer system, the information comprising an attribute of the workload;

predicting a classification of the workload of the computer system based at least in part on the attribute of the workload;

identifying a template associated with a metric specific to the classification of the workload;

generating a user interface based at least in part on the template, the user interface comprising the metric specific to the classification of the workload, wherein the metric specific to the classification of the workload describes a distribution of input/output performed across a disk or a distribution of input/output performed across a disk controller; and displaying the user interface comprising the metric specific to the classification of the workload.

6. The method of claim 5, wherein predicting the classification of the workload of the computer system is further based at least in part on a set of rules describing a correlation between the attribute of the workload and the classification of the workload and at least one of (i) the set of rules describing the correlation between the attribute of the workload and the classification of the workload correlates an identifier associated with the computer system and the classification of the workload; (ii) the set of rules describing the correlation between the attribute of the workload and the classification of the workload correlates an input/output pattern of the workload and the classification of the workload; or (iii) the set of rules describing the correlation between the attribute of the workload and the classification of the workload correlates a usage of computing resources and the classification of the workload.

7. The method of claim 5, wherein the metric specific to the classification of the workload describes a disk latency, a CPU ready time, or a ratio of virtual CPU to physical CPU.

8. A method for generating a workload-specific user interface, the method comprising:

receiving information describing a workload of a computer system, the information comprising an attribute of the workload;

predicting a classification of the workload of the computer system based at least in part on the attribute of the workload;

identifying a template associated with a metric specific to the classification of the workload;

generating a user interface based at least in part on the template, the user interface comprising the metric specific to the classification of the workload, wherein generating the user interface based at least in part on the template is further based at least in part on a rule describing a correlation between the metric specific to the classification of the workload and the classification of the workload; and displaying the user interface comprising the metric specific to the classification of the workload.

9. The method of claim 8, wherein predicting the classification of the workload of the computer system is further based at least in part on a set of rules describing a correlation between the attribute of the workload and the classification of the workload and at least one of (i) the set of rules describing the correlation between the attribute of the workload and the classification of the workload correlates an identifier associated with the computer system and the classification of the workload; (ii) the set of rules describing the correlation between the attribute of the workload and the classification of the workload correlates an input/output pattern of the workload and the classification of the workload; or (iii) the set of rules describing the correlation between the attribute of the workload and the classification of the workload correlates a usage of computing resources and the classification of the workload.

10. The method of claim 8, wherein the metric specific to the classification of the workload describes a disk latency, a CPU ready time, or a ratio of virtual CPU to physical CPU.

11. A computer program product embodied on a non-transitory computer readable medium, the computer readable medium having stored thereon a sequence of instructions which, when executed by a processor causes the processor to execute a method for generating a workload-specific user interface, comprising:

receiving information describing a workload of a computer system, the information comprising an attribute of the workload;

predicting a classification of the workload of the computer system based at least in part on the attribute of the workload, wherein predicting the classification of the workload of the computer system is further based at least in part on a rule describing a correlation between the attribute of the workload and the classification of the workload, the rule describing the correlation between the attribute of the workload and the classification of the workload correlates an identifier associated with the computer system and the classification of the workload;

identifying a template associated with a metric specific to the classification of the workload;

generating a user interface based at least in part on the template, the user interface comprising the metric specific to the classification of the workload; and displaying the user interface comprising the metric specific to the classification of the workload.

12. The computer program product of claim 11, wherein the rule describing the correlation between the attribute of the workload and the classification of the workload correlates a usage of computing resources and the classification of the workload.

13. The computer program product of claim 11, wherein predicting the classification of the workload of the computer system is further based at least in part on a set of profiles associated with the classification of the workload, the set of profiles correlating the attribute of the workload with the classification of the workload.

14. The computer program product of claim 11, wherein the metric specific to the classification of the workload describes a disk latency.

15. The computer program product of claim 11, wherein the computer system comprises a virtual machine supported by a node of a networked virtualization system.

16. The computer program product of claim 15, wherein the metric specific to the classification of the workload comprises a ratio of virtual CPU to physical CPU.

17. The computer program product of claim 15, wherein the metric specific to the classification of the workload comprises a CPU ready time.

18. The computer program product of claim 11, wherein generating the user interface based at least in part on the template further comprises:
determining a value of each of the metric specific to the classification of the workload based at least in part on the information describing the workload of the computer system.

19. The computer program product of claim 11, wherein generating the user interface based at least in part on the template is further based at least in part on a set of rules describing a correlation between the metric specific to the classification of the workload and the classification of the workload.

20. The computer program product of claim 11, wherein the metric specific to the classification of the workload describes one or more of a distribution of input/output performed across a disk and a distribution of input/output performed across a disk controller.

21. A computer program product embodied on a non-transitory computer readable medium, the computer readable medium having stored thereon a sequence of instructions which, when executed by a processor causes the processor to execute a method for generating a workload-specific user interface, comprising:

receiving information describing a workload of a computer system, the information comprising an attribute of the workload;

predicting a classification of the workload of the computer system based at least in part on the attribute of the workload, wherein predicting the classification of the workload of the computer system is further based at least in part on a rule describing a correlation between the attribute of the workload and the classification of the workload, the rule describing the correlation between the attribute of the workload and the classification of the workload correlates an input/output pattern of the workload and the classification of the workload;

identifying a template associated with a metric specific to the classification of the workload;

generating a user interface based at least in part on the template, the user interface comprising the metric specific to the classification of the workload; and displaying the user interface comprising the metric specific to the classification of the workload.

22. The computer program product of claim 21, wherein predicting the classification of the workload of the computer system is further based at least in part on a set of profiles associated with the classification of the workload, the set of profiles correlating the attribute of the workload with the classification of the workload.

23. The computer program product of claim 21, wherein the metric specific to the classification of the workload describes one or more of a distribution of input/output performed across a disk and a distribution of input/output performed across a disk controller.

24. The computer program product of claim 21, wherein predicting the classification of the workload of the computer system is further based at least in part on a set of profiles associated with the classification of the workload, the set of profiles correlating the attribute of the workload with the classification of the workload.

25. The computer program product of claim 21, wherein the metric specific to the classification of the workload describes a disk latency, a CPU ready time, or a ratio of virtual CPU to physical CPU.

26. The computer program product of claim 21, wherein generating the user interface based at least in part on the template is further based at least in part on a set of rules describing a correlation between the metric specific to the classification of the workload and the classification of the workload.

27. The computer program product of claim 21, wherein generating the user interface based at least in part on the template further comprises:
determining a value of each of the metric specific to the classification of the workload based at least in part on the information describing the workload of the computer system.

28. A computer program product embodied on a non-transitory computer readable medium, the computer readable medium having stored thereon a sequence of instructions which, when executed by a processor causes the processor to execute a method for generating a workload-specific user interface, comprising:

receiving information describing a workload of a computer system, the information comprising an attribute of the workload;

predicting a classification of the workload of the computer system based at least in part on the attribute of the workload;

identifying a template associated with a metric specific to the classification of the workload;

generating a user interface based at least in part on the template, the user interface comprising the metric specific to the classification of the workload, wherein the metric specific to the classification of the workload describes a distribution of input/output performed across a disk or a distribution of input/output performed across a disk controller; and displaying the user interface comprising the metric specific to the classification of the workload.

29. The computer program product of claim 28, wherein predicting the classification of the workload of the computer system is further based at least in part on a set of rules describing a correlation between the attribute of the workload and the classification of the workload, and the set of rules describing the correlation between the attribute of the workload and the classification of the workload correlates an identifier associated with the computer system and the classification of the workload.

30. The computer program product of claim 28, wherein predicting the classification of the workload of the computer system is further based at least in part on a set of rules describing a correlation between the attribute of the workload and the classification of the workload, and the set of rules describing the correlation between the attribute of the workload and the classification of the workload correlates an input/output pattern of the workload and the classification of the workload.

31. The computer program product of claim 28, wherein predicting the classification of the workload of the computer system is further based at least in part on a set of rules describing a correlation between the attribute of the workload and the classification of the workload, and the set of rules describing the correlation between the attribute of the workload and the classification of the workload correlates a usage of computing resources and the classification of the workload.

32. The computer program product of claim 28, wherein predicting the classification of the workload of the computer system is further based at least in part on a set of profiles associated with the classification of the workload, the set of profiles correlating the attribute of the workload with the classification of the workload.

33. The computer program product of claim 28, wherein the metric specific to the classification of the workload describes a disk latency, a CPU ready time, or a ratio of virtual CPU to physical CPU.

34. The computer program product of claim 28, wherein the computer system comprises a virtual machine supported by a node of a networked virtualization system.

35. The computer program product of claim 28, wherein generating the user interface based at least in part on the template is further based at least in part on a set of rules describing a correlation between the metric specific to the classification of the workload and the classification of the workload.

36. The computer program product of claim 28, wherein generating the user interface based at least in part on the template further comprises:

determining a value of each of the metric specific to the classification of the workload based at least in part on the information describing the workload of the computer system.

37. A computer program product embodied on a non-transitory computer readable medium, the computer readable medium having stored thereon a sequence of instructions which, when executed by a processor causes the processor to execute a method for generating a workload-specific user interface, comprising:

receiving information describing a workload of a computer system, the information comprising an attribute of the workload;

predicting a classification of the workload of the computer system based at least in part on the attribute of the workload;

identifying a template associated with a metric specific to the classification of the workload;

generating a user interface based at least in part on the template, the user interface comprising the metric specific to the classification of the workload, wherein generating the user interface based at least in part on the template is further based at least in part on a rule describing a correlation between the metric specific to the classification of the workload and the classification of the workload; and displaying the user interface comprising the metric specific to the classification of the workload.

38. The computer program product of claim 37, wherein predicting the classification of the workload of the computer system is further based at least in part on a set of rules describing a correlation between the attribute of the workload and the classification of the workload , and the set of rules describing the correlation between the attribute of the workload and the classification of the workload correlates an identifier associated with the computer system and the classification of the workload.

39. The computer program product of claim 37, wherein predicting the classification of the workload of the computer system is further based at least in part on a set of rules describing a correlation between the attribute of the workload and the classification of the workload , and the set of rules describing the correlation between the attribute of the workload and the classification of the workload correlates an input/output pattern of the workload and the classification of the workload.

40. The computer program product of claim 37, wherein predicting the classification of the workload of the computer system is further based at least in part on a set of rules describing a correlation between the attribute of the workload and the classification of the workload , and the set of rules describing the correlation between the attribute of the workload and the classification of the workload correlates a usage of computing resources and the classification of the workload.

41. The computer program product of claim 37, wherein predicting the classification of the workload of the computer system is further based at least in part on a set of profiles associated with the classification of the workload, the set of profiles correlating the attribute of the workload with the classification of the workload.

42. The computer program product of claim 37, wherein the metric specific to the classification of the workload describes a disk latency, a CPU ready time, or a ratio of virtual CPU to physical CPU.

43. The computer program product of claim 37, wherein the metric specific to the classification of the workload describes one or more of a distribution of input/output performed across a disk and a distribution of input/output performed across a disk controller.

44. The computer program product of claim 37, wherein the computer system comprises a virtual machine supported by a node of a networked virtualization system.

45. The computer program product of claim 37, wherein generating the user interface based at least in part on the template further comprises:
  determining a value of each of the metric specific to the classification of the workload based at least in part on the information describing the workload of the computer system.

46. A computer system to implement a method for generating a workload-specific user interface, comprising:
  a memory for storing data and instructions; and
  a processor that executes a sequence of instructions which, when executed by the processor causes the processor to execute a process, the process comprising:
    receiving information describing a workload of a computer system, the information comprising an attribute of the workload;
    predicting a classification of the workload of the computer system based at least in part on the attribute of the workload, wherein predicting the classification of the workload of the computer system is further based at least in part on a rule describing a correlation between the attribute of the workload and the classification of the workload, the rule describing the correlation between the attribute of the workload and the classification of the workload correlates an identifier associated with the computer system and the classification of the workload;
    identifying a template associated with a metric specific to the classification of the workload;
    generating a user interface based at least in part on the template, the user interface comprising the metric specific to the classification of the workload; and
    displaying the user interface comprising the metric specific to the classification of the workload.

47. A computer system to implement a method for generating a workload-specific user interface, comprising:
  a memory for storing data and instructions; and
  a processor that executes a sequence of instructions which, when executed by the processor causes the processor to execute a process, the process comprising:
    receiving information describing a workload of a computer system, the information comprising an attribute of the workload;
    predicting a classification of the workload of the computer system based at least in part on the attribute of the workload, wherein predicting the classification of the workload of the computer system is further based at least in part on a rule describing a correlation between the attribute of the workload and the classification of the workload, the rule describing the correlation between the attribute of the workload and the classification of the workload correlates an input/output pattern of the workload and the classification of the workload;
    identifying a template associated with a metric specific to the classification of the workload;
    generating a user interface based at least in part on the template, the user interface comprising the metric specific to the classification of the workload; and
    displaying the user interface comprising the metric specific to the classification of the workload.

48. A computer system to implement a method for generating a workload-specific user interface, comprising:
  a memory for storing data and instructions; and
  a processor that executes a sequence of instructions which, when executed by the processor causes the processor to execute a process, the process comprising:
    receiving information describing a workload of a computer system, the information comprising an attribute of the workload;
    predicting a classification of the workload of the computer system based at least in part on the attribute of the workload;
    identifying a template associated with a metric specific to the classification of the workload;
    generating a user interface based at least in part on the template, the user interface comprising the metric specific to the classification of the workload, wherein the metric specific to the classification of the workload describes a distribution of input/output performed across a disk or a distribution of input/output performed across a disk controller; and
    displaying the user interface comprising the metric specific to the classification of the workload.

49. The computer system of claim 48, wherein predicting the classification of the workload of the computer system is further based at least in part on a set of rules describing a correlation between the attribute of the workload and the classification of the workload and at least one of (i) the set of rules describing the correlation between the attribute of the workload and the classification of the workload correlates an identifier associated with the computer system and the classification of the workload; (ii) the set of rules describing the correlation between the attribute of the workload and the classification of the workload correlates an input/output pattern of the workload and the classification of the workload; or (iii) the set of rules describing the correlation between the attribute of the workload and the classification of the workload correlates a usage of computing resources and the classification of the workload.

50. A computer system to implement a method for generating a workload-specific user interface, comprising:
  a memory for storing data and instructions; and
  a processor that executes a sequence of instructions which, when executed by the processor causes the processor to execute a process, the process comprising:
    receiving information describing a workload of a computer system, the information comprising an attribute of the workload;
    predicting a classification of the workload of the computer system based at least in part on the attribute of the workload;
    identifying a template associated with a metric specific to the classification of the workload;
    generating a user interface based at least in part on the template, the user interface comprising the metric specific to the classification of the workload, wherein generating the user interface based at least in part on the template is further based at least in part on a rule describing a correlation between the metric specific to the classification of the workload and the classification of the workload; and
    displaying the user interface comprising the metric specific to the classification of the workload.

51. The computer system of claim 50, wherein predicting the classification of the workload of the computer system is further based at least in part on a set of rules describing a correlation between the attribute of the workload and the classification of the workload and at least one of (i) the set of rules describing the correlation between the attribute of the workload and the classification of the workload correlates an identifier associated with the computer system and the classification of the workload; (ii) the set of rules describing the correlation between the attribute of the workload and the classification of the workload correlates an input/output pattern of the workload and the classification of the workload; or (iii) the set of rules describing the correlation between the attribute of the workload and the classification of the workload correlates a usage of computing resources and the classification of the workload.

\* \* \* \* \*